United States Patent
Zhang et al.

(10) Patent No.: US 9,119,186 B2
(45) Date of Patent: Aug. 25, 2015

(54) FREQUENCY DOMAIN DUPLICATION IN A LONG-RANGE WIRELESS LOCAL AREA NETWORK

(71) Applicant: Marvell World Trade Ltd., St. Michael (BB)

(72) Inventors: Hongyuan Zhang, Fremont, CA (US); Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 104 days.

(21) Appl. No.: 13/900,932

(22) Filed: May 23, 2013

(65) Prior Publication Data

US 2013/0315163 A1  Nov. 28, 2013

Related U.S. Application Data

(60) Provisional application No. 61/651,084, filed on May 24, 2012.

(51) Int. Cl.
| | |
|---|---|
| H04J 11/00 | (2006.01) |
| H04W 72/04 | (2009.01) |
| H04L 5/00 | (2006.01) |
| H04L 27/26 | (2006.01) |

(52) U.S. Cl.
CPC .............. *H04W 72/04* (2013.01); *H04L 5/001* (2013.01); *H04L 27/2602* (2013.01); *H04L 27/2613* (2013.01); *H04L 27/2621* (2013.01)

(58) Field of Classification Search
None
See application file for complete search history.

(56) References Cited

U.S. PATENT DOCUMENTS

| 8,144,647 B2 | 3/2012 | Nabar et al. |
|---|---|---|
| 8,811,203 B1 | 8/2014 | Liu et al. |
| 8,826,106 B2 | 9/2014 | Zhang et al. |
| 8,867,653 B2 | 10/2014 | Zhang et al. |
| 8,885,740 B2 | 11/2014 | Zhang et al. |

(Continued)

FOREIGN PATENT DOCUMENTS

| WO | WO-2012051319 | 4/2012 |
|---|---|---|
| WO | WO-2012/122119 A1 | 9/2012 |

OTHER PUBLICATIONS

Park, "Proposed Specification Framework for TGah", *The Institute of Electrical and Electronics Engineers*, doc. No. IEEE 802.11-11/1137r6, (Mar. 2012).

(Continued)

*Primary Examiner* — Anh-Vu Ly

(57) ABSTRACT

A method for generating OFDM signals is implemented in a device operating according to a communication protocol. The protocol defines non-duplicate mode data units corresponding to single component channels of a BSS channel, and non-duplicate mode data units corresponding to sets of adjacent component channels. Non-duplicate mode data units corresponding to a set of component channels have more lower-edge and/or upper-edge guard tones than non-duplicate mode data units corresponding to single component channels. The method includes determining that a duplicate mode will be utilized for an OFDM transmission in the set of component channels and, in response, generating a duplicate mode data unit. The duplicate mode data unit has fewer lower-edge and/or upper-edge guard tones than a non-duplicate mode data unit corresponding to a set of component channels, and includes one duplicate of the non-duplicate mode data unit corresponding to the single component channel for each adjacent component channel.

20 Claims, 10 Drawing Sheets

(56) References Cited

U.S. PATENT DOCUMENTS

| | | | |
|---|---|---|---|
| 8,891,435 | B2 | 11/2014 | Zhang et al. |
| 8,902,869 | B2 | 12/2014 | Zhang et al. |
| 8,948,283 | B2 | 2/2015 | Zhang |
| 2009/0196163 | A1 | 8/2009 | Du |
| 2012/0201316 | A1 | 8/2012 | Zhang et al. |
| 2012/0263156 | A1* | 10/2012 | Abraham et al. ............ 370/338 |
| 2012/0294294 | A1 | 11/2012 | Zhang |
| 2013/0044607 | A1 | 2/2013 | Liu et al. |
| 2013/0044687 | A1 | 2/2013 | Liu et al. |
| 2013/0044688 | A1 | 2/2013 | Liu et al. |
| 2013/0044877 | A1 | 2/2013 | Liu et al. |
| 2013/0107893 | A1* | 5/2013 | Zhang ............................ 370/474 |
| 2013/0177090 | A1* | 7/2013 | Yang et al. ..................... 375/260 |
| 2013/0202001 | A1 | 8/2013 | Zhang |
| 2013/0208822 | A1 | 8/2013 | Zhang et al. |
| 2013/0243115 | A1* | 9/2013 | Taghavi Nasrabadi et al. ............................ 375/295 |
| 2013/0266083 | A1* | 10/2013 | Baik et al. ..................... 375/260 |
| 2013/0343433 | A1* | 12/2013 | Yang et al. .................... 375/146 |
| 2013/0343478 | A1* | 12/2013 | Yang et al. .................... 375/295 |
| 2014/0269770 | A1* | 9/2014 | Kenney et al. ................ 370/474 |

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

International Search Report in corresponding PCT/US2013/042403 mailed Sep. 13, 2013.

Written Opinion in corresponding PCT/US2013/042403 mailed Sep. 13, 2013.

Coffey et al., Joint Proposal PHY Specification: IEEE 802.11-05/1102r4, Jan. 14, 2006.

Kim et al., "160 MHz PHY Transmission," IEEE 802.11-10/0378r1, May 17, 2010.

Zhang et al., "2MHz Dup Mode," IEEE 802.11-13/0060r0, Jan. 14, 2013.

de Vegt, "Potential Compromise for 802.11ah Use Case Document", Institute of Electrical and Electronics Engineers, doc. No. IEEE 802.11-11/0457r0, pp. 1-27 (Mar. 2011).

Lee et al., "TGaf PHY proposal," *The Institute of Electrical and Electronics Engineers*, doc. No. IEEE 802.11-12/0809r5, pp. 1-43 (Jul. 10, 2012).

Park, "Proposed Specification Framework for TGah", *The Institute of Electrical and Electronics Engineers*, doc. No. IEEE 802.11—yy/xxxxr05, (Jan. 2012).

Park, "Proposed Specification Framework for TGah D9.x", *The Institute of Electrical and Electronics Engineers*, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Proposed Specification Framework for TGah", *The Institute of Electrical and Electronics Engineers*, doc. No. IEEE 802.11-11/1137r6, pp. 1-13 (Mar. 2012).

Park, "Specification Framework for TGah," *The Institute of Electrical and Electronics Engineers*, doc. No. IEEE 802.11-11/1137r13, pp. 1-58 (Jan. 14, 2013).

Shao, "Channel Selection for 802.11ah," doc.: IEEE 802.11-12/0816r0, pp. 1-11 (Jul. 2012).

Taghavi et al., "Introductory Submission for TGah", doc. No. IEEE 802.11-11/0062r0, *Institute for Electrical and Electronics Engineers* pp. 1-5 (Jan. 14, 2011).

Vermani, et al. "Preamble Format for 1 MHz," *The Institute of Electrical and Electronics Engineers*, doc. No. IEEE 802.11-11/1482r2, pp. 1-30 (Nov. 2011).

Vermani, et al. "Spec Framework Text for PHY Numerology," *The Institute of Electrical and Electronics Engineers*, doc. No. IEEE 802.11-11/13111-0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1 MHz Waveform in Wider BW ", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

International Preliminary Report on Patentability in International Application No. PCT/US2013/042403, dated Nov. 25, 2014 (7 pages).

\* cited by examiner

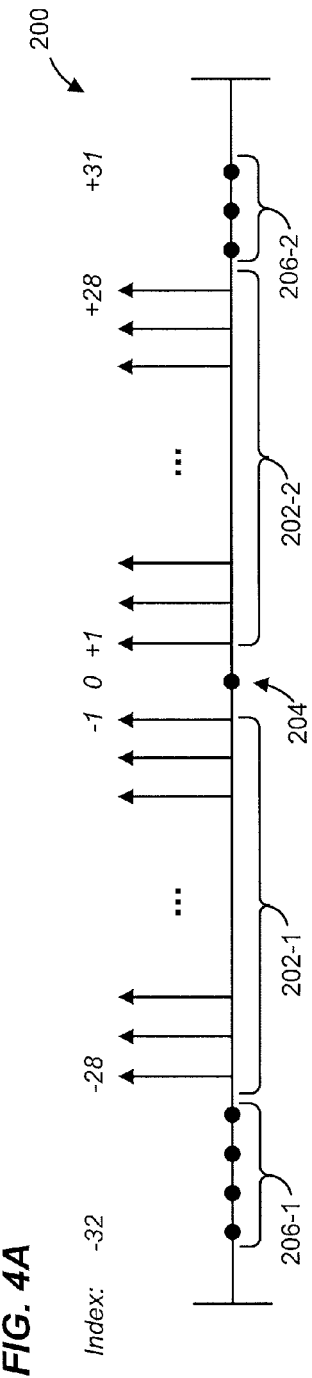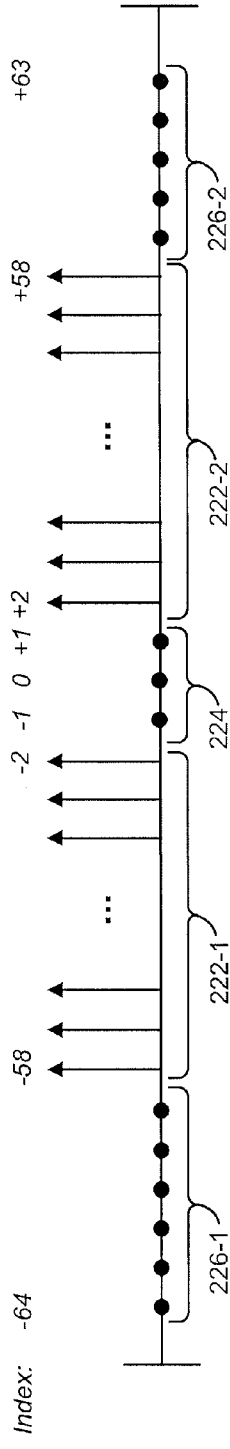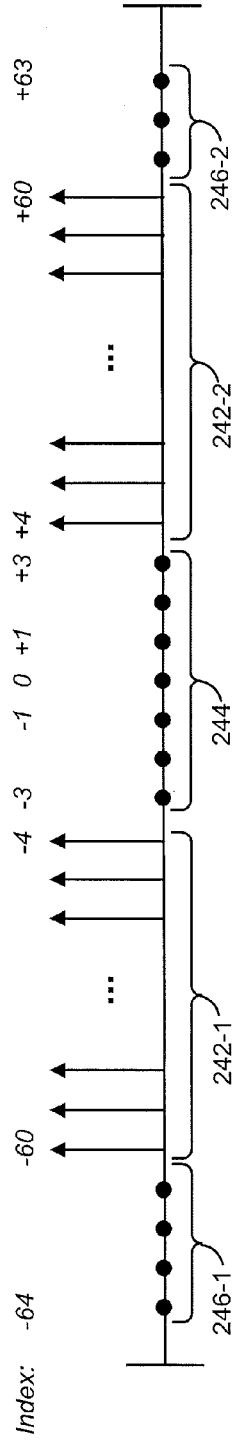

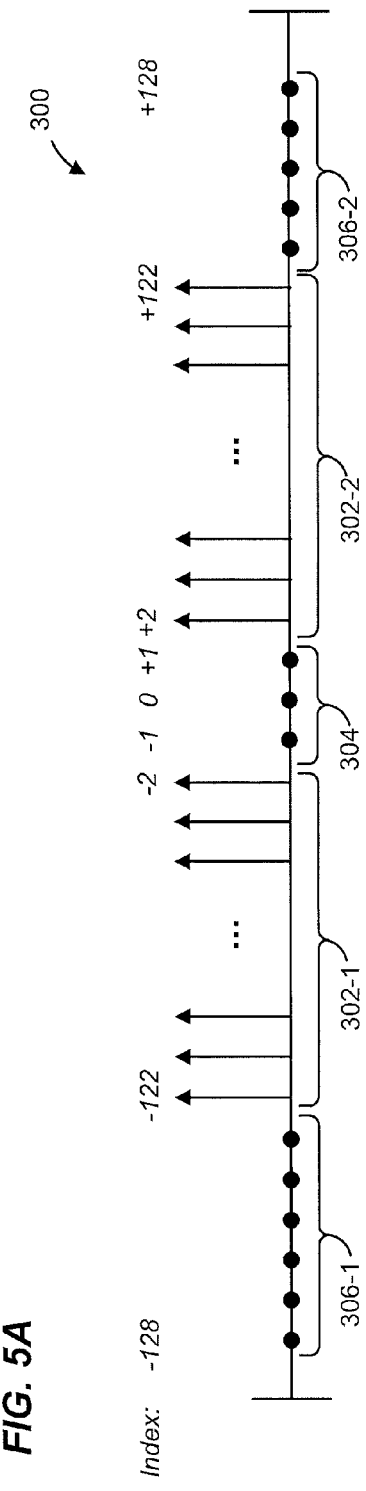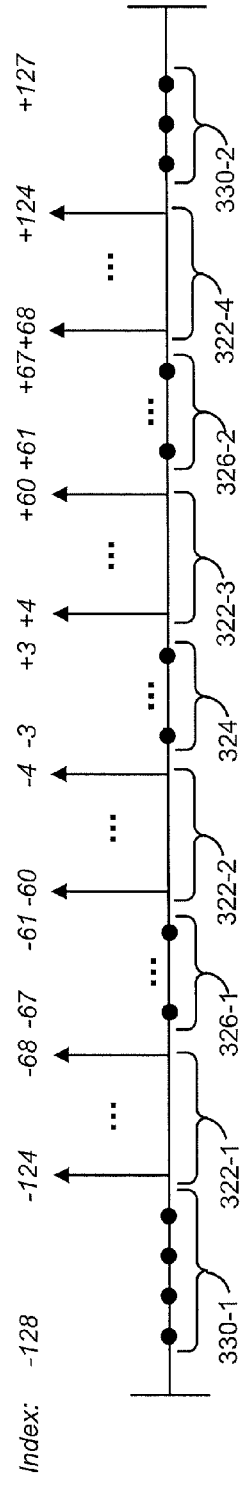

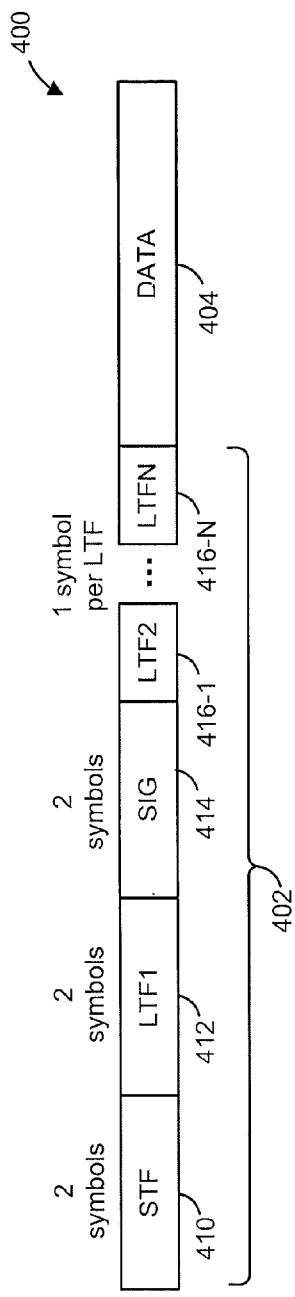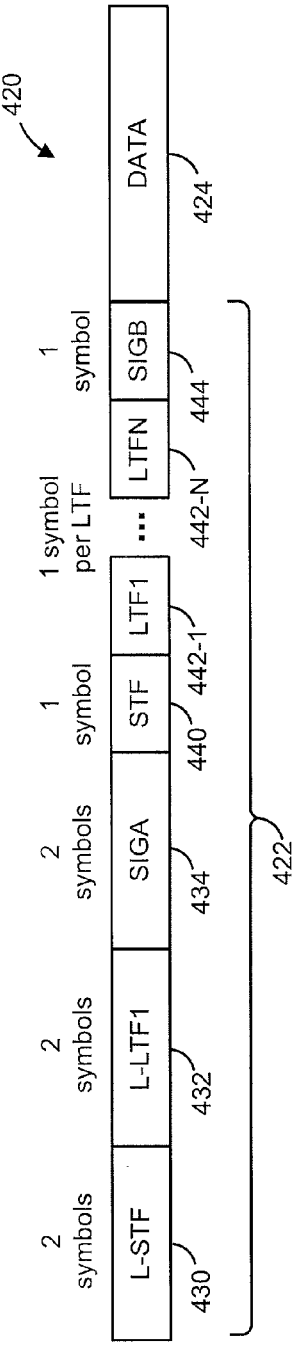
FIG. 6A
FIG. 6B

FREQUENCY DOMAIN DUPLICATION IN A LONG-RANGE WIRELESS LOCAL AREA NETWORK

CROSS-REFERENCES TO RELATED APPLICATIONS

This claims the benefit of U.S. Provisional Patent Application No. 61/651,084, entitled "Frequency Domain 2 MHz (64FFT) Duplication in 802.11ah" and filed on May 24, 2012, the disclosure of which is incorporated herein by reference.

FIELD OF THE DISCLOSURE

The present disclosure relates generally to communication networks and, more particularly, to long range wireless local area networks.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

A method for generating orthogonal frequency division multiplexing (OFDM) signals to be transmitted in a basic service set (BSS) channel is implemented in a communication device operating according to a communication protocol. A set of two or more component channels is collectively coextensive with the BSS channel. The communication protocol defines (i) a non-duplicate mode data unit corresponding to a single component channel within the set of two or more component channels and (ii) a non-duplicate mode data unit corresponding to a first set of adjacent component channels within the set of two or more component channels. The non-duplicate mode data unit corresponding to the single component channel has (i) a first number of lower-edge guard tones and (ii) a first number of upper-edge guard tones. The non-duplicate mode data unit corresponding to the first set of adjacent component channels has (i) a second number of lower-edge guard tones and (ii) a second number of upper-edge guard tones. At least one of (i) the second number of lower-edge guard tones is greater than the first number of lower-edge guard tones or (ii) the second number of upper-edge guard tones is greater than the first number of upper-edge guard tones. The method includes determining, at the communication device, that a duplicate mode will be utilized for a first OFDM transmission in the first set of adjacent component channels, and in response to determining that the duplicate mode will be utilized for the first OFDM transmission, generating, at the communication device, a first duplicate mode data unit corresponding to the first set of adjacent component channels, such that the first duplicate mode data unit has one or both of (i) less than the second number of lower-edge guard tones and (ii) less than the second number of upper-edge guard tones. The first duplicate mode data unit includes, for each component channel in the first set of adjacent component channels, one duplicate, in frequency, of the non-duplicate mode data unit corresponding to the single component channel.

In another embodiment, a communication device includes a network interface configured to operate according to a communication protocol. The communication protocol defines (i) a non-duplicate mode data unit corresponding to a single component channel within a set of two or more component channels collectively coextensive with a basic service set (BSS) channel, and (ii) a non-duplicate mode data unit corresponding to a set of adjacent component channels within the set of two or more component channels. The non-duplicate mode data unit corresponding to the single component channel has (i) a first number of lower-edge guard tones and (ii) a first number of upper-edge guard tones. The non-duplicate mode data unit corresponding to the set of adjacent component channels has (i) a second number of lower-edge guard tones and (ii) a second number of upper-edge guard tones, and at least one of (i) the second number of lower-edge guard tones is greater than the first number of lower-edge guard tones or (ii) the second number of upper-edge guard tones is greater than the first number of upper-edge guard tones. The network interface is also configured to determine that a duplicate mode will be utilized for an orthogonal frequency division multiplexing (OFDM) transmission in the set of adjacent component channels, and, in response to determining that the duplicate mode will be utilized for the OFDM transmission, generate a duplicate mode data unit corresponding to the set of adjacent component channels, such that the duplicate mode data unit has one or both of (i) less than the second number of lower-edge guard tones and (ii) less than the second number of upper-edge guard tones. The duplicate mode data unit includes, for each component channel in the set of adjacent component channels, one duplicate, in frequency, of the non-duplicate mode data unit corresponding to the single component channel.

In another embodiment, a nontransitory computer-readable medium stores instructions for operating according to a communication protocol. The communication protocol defines (i) a non-duplicate mode data unit corresponding to a single component channel within a set of two or more component channels collectively coextensive with a basic service set (BSS) channel and (ii) a non-duplicate mode data unit corresponding to a set of adjacent component channels within the set of two or more component channels. The non-duplicate mode data unit corresponding to the single component channel has (i) a first number of lower-edge guard tones and (ii) a first number of upper-edge guard tones. The non-duplicate mode data unit corresponding to the set of adjacent component channels has (i) a second number of lower-edge guard tones and (ii) a second number of upper-edge guard tones. At least one of (i) the second number of lower-edge guard tones is greater than the first number of lower-edge guard tones or (ii) the second number of upper-edge guard tones is greater than the first number of upper-edge guard tones. The instructions, when executed by one or more processors, cause the one or more processors to determine that a duplicate mode will be utilized for an orthogonal frequency division multiplexing (OFDM) transmission in the set of adjacent component channels. The instructions also cause the one or more processors to, in response to determining that the duplicate mode will be utilized for the OFDM transmission, generate a duplicate mode data unit corresponding to the set of adjacent component channels, such that the duplicate mode data unit has one or both of (i) less than the second number of lower-edge guard tones and (ii) less than the second number of upper-edge guard tones. The duplicate mode data unit includes, for each component channel in the set of adjacent component channels, one duplicate, in frequency, of the non-duplicate mode data unit corresponding to the single component channel.

BRIEF DESCRIPTION OF THE DRAWINGS

FIGS. 4A, 4B and 4C are example tone map diagrams of a 2 MHz long range data unit, a true 4 MHz long range data unit, and a duplicate mode 4 MHz long range data unit, respectively, according to an embodiment.

FIGS. 5A and 5B are example tone map diagrams of a true 8 MHz long range data unit and a duplicate mode 8 MHz long range data unit, respectively, according to an embodiment.

FIGS. 6A and 6B are diagrams of an example long range data unit having a short preamble format and an example long range data unit having a long preamble format, respectively, according to an embodiment.

DETAILED DESCRIPTION

Figure 1:
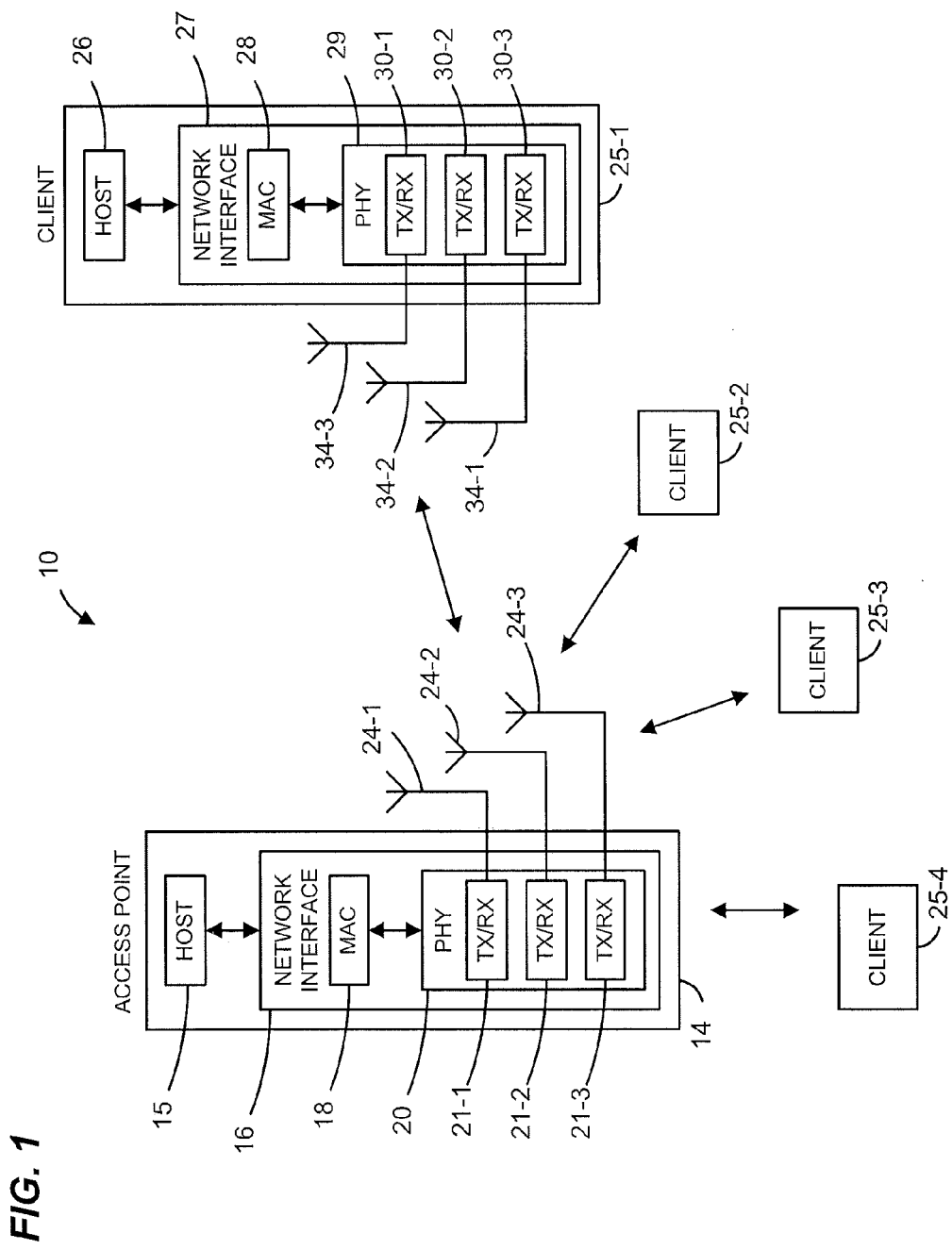
FIG. 1 is a block diagram of an example wireless local area network (WLAN) in which a long range communication protocol is implemented, according to an embodiment.

In embodiments described below, a wireless network device such as an access point (AP) of a wireless local area network (WLAN) transmits data streams to one or more client stations. The AP is configured to operate with client stations according to at least one communication protocol. The communication protocol defines operation in a sub-1 GHz frequency range, and is typically used for applications requiring long range wireless communication with relatively low data rates. The communication protocol (e.g., IEEE 802.11ah or IEEE 802.11af) is referred to herein as a "long range" communication protocol. In some embodiments, physical layer (PHY) data units conforming to the long range communication protocol ("long range data units") are the same as or similar to "short range" data units conforming to a higher frequency, shorter range communication protocol (e.g., IEEE 802.11n, and/or IEEE 802.11ac), but are generated using a lower clock rate (e.g., by downclocking an IEEE 802.11n or 802.11ac signal). In one embodiment, for example, the long range communication protocol defines 2 MHz, 4 MHz, 8 MHz and 16 MHz data units that are substantially similar to IEEE 802.11n or 802.11ac 20 MHz, 40 MHz, 80 MHz and 160 MHz data units, respectively, and are generated using the same inverse fast Fourier transform (IFFT) size as the respective IEEE 802.11n or 802.11ac data unit, but are generated using a ten times slower clock rate than the respective IEEE 802.11n or 802.11ac data unit. Like IEEE 802.11n and IEEE 802.11ac short range data units, long range data units are transmitted on multiple subcarriers/tones, using orthogonal frequency division multiplexing (OFDM), over a wireless channel. Example formats of long range data units, according to various embodiments, are described in U.S. patent application Ser. No. 13/359,336, "Physical Layer Frame Format For Long Range WLAN," the disclosure of which is hereby incorporated by reference herein.

The IEEE 802.11n and 802.11ac Standards each define one or more "duplicate" modes in which some or all of a 20 MHz data unit (packet) is replicated in two or more sub-bands of a 40 MHz or greater data unit. Frequency duplication allows combining at the receiver (e.g., maximal-ratio combining), which can in turn increase receiver sensitivity and provide extended range. Duplication can also provide improved bandwidth protection within a basic service set (BSS), or between a BSS and a BSS of another AP (OBSS). Both IEEE 802.11n and 802.11ac define a "legacy duplicate mode" in which the preamble and data portion of a 20 MHz legacy packet (i.e., a data unit that can be decoded by an IEEE 802.11a or 802.11g compliant receiver) is replicated in each 20 MHz sub-band of a 40 MHz or greater packet, with a different phase shift factor being applied to each 20 MHz sub-band in order to reduce the peak-to-average power ratio (PAPR) of the OFDM signal. In addition, the IEEE 802.11n Standard defines a special modulation and coding scheme (MCS), "MCS32," in which a 40 MHz signal duplicates a 6 megabits per second (Mbps) data portion of a 20 MHz legacy packet in the lower and upper 20 MHz sub-bands, while the 40 MHz signal preamble includes a short training field (STF), long training field (LTF), and signal (SIG) field that instead follows the preamble of a true 40 MHz packet. As used herein, the modifier "true" is used to indicate that a data unit (e.g., packet) does not utilize frequency duplication (e.g., does not duplicate a preamble, preamble portion, and/or data portion of a narrower bandwidth data unit within each of multiple sub-bands). As in the legacy duplicate mode of IEEE 802.11n and 802.11ac, the MCS32 duplicate mode applies a different phase shift factor to each 20 MHz sub-band in order to reduce the PAPR of the OFDM signal. The MCS32 duplicate mode of IEEE 802.11n, and the legacy duplicate mode of IEEE 802.11n and 802.11ac, are discussed in more detail below with reference to FIGS. 3A-3D. As will be seen, 20 MHz legacy packets each include a larger number of upper-edge and lower-edge guard tones (in the LTF and the data portion) as compared to a 20 MHz non-legacy packet, which provides certain advantages when using the IEEE 802.11n/ac legacy duplicate mode or IEEE 802.11n MCS32 duplicate mode. In some embodiments where the long range communication protocol defines long range data units that are substantially similar to down-clocked versions of IEEE 802.11n or 802.11ac signals, the long range communication protocol, however, does not define any down-clocked versions of legacy packets. Thus, in these embodiments, the long range communication protocol does not define a legacy duplicate mode, and does not support a down-clocked version of the MCS32 duplicate mode in which a legacy data portion is duplicated in each of multiple sub-bands. As a result, a different approach is required if the long range communication protocol is to provide a duplicate mode for increased receiver sensitivity. Various embodiments of such an approach are described below, along with a more detailed description of the duplicate modes currently defined under the IEEE 802.11n and 802.11ac Standards.

FIG. 1 is a block diagram of an example WLAN 10 in which a long range communication protocol is implemented, according to an embodiment. The WLAN 10 includes an AP 14 having a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In an embodiment, the PHY processing unit 20 of the AP 14 is configured to generate data units conforming to the long range communication protocol, and the transceiver(s) 21 is/are configured to transmit the generated data units via the antenna(s) 24. Similarly, the PHY processing unit 20 of the AP 14 is configured to process received data units conforming to the long range communication protocol, in an embodiment, with the data units being received by the transceiver(s) 24 via the antenna(s) 24. Data units conforming to the long range protocol will be described with reference to FIGS. 4-8 below, according to various different embodiments.

In an embodiment, the PHY processing unit 29 of the client device 25-1 is also configured to generate data units conforming to the long range communication protocol, and the transceiver(s) 30 is/are configured to transmit the generated data units via the antenna(s) 34. Similarly, the PHY processing unit 29 of the client device 25-1 is configured to process received data units conforming to the long range communication protocol, in an embodiment, with the data units being received by the transceiver(s) 30 via the antenna(s) 34.

Figure 2:
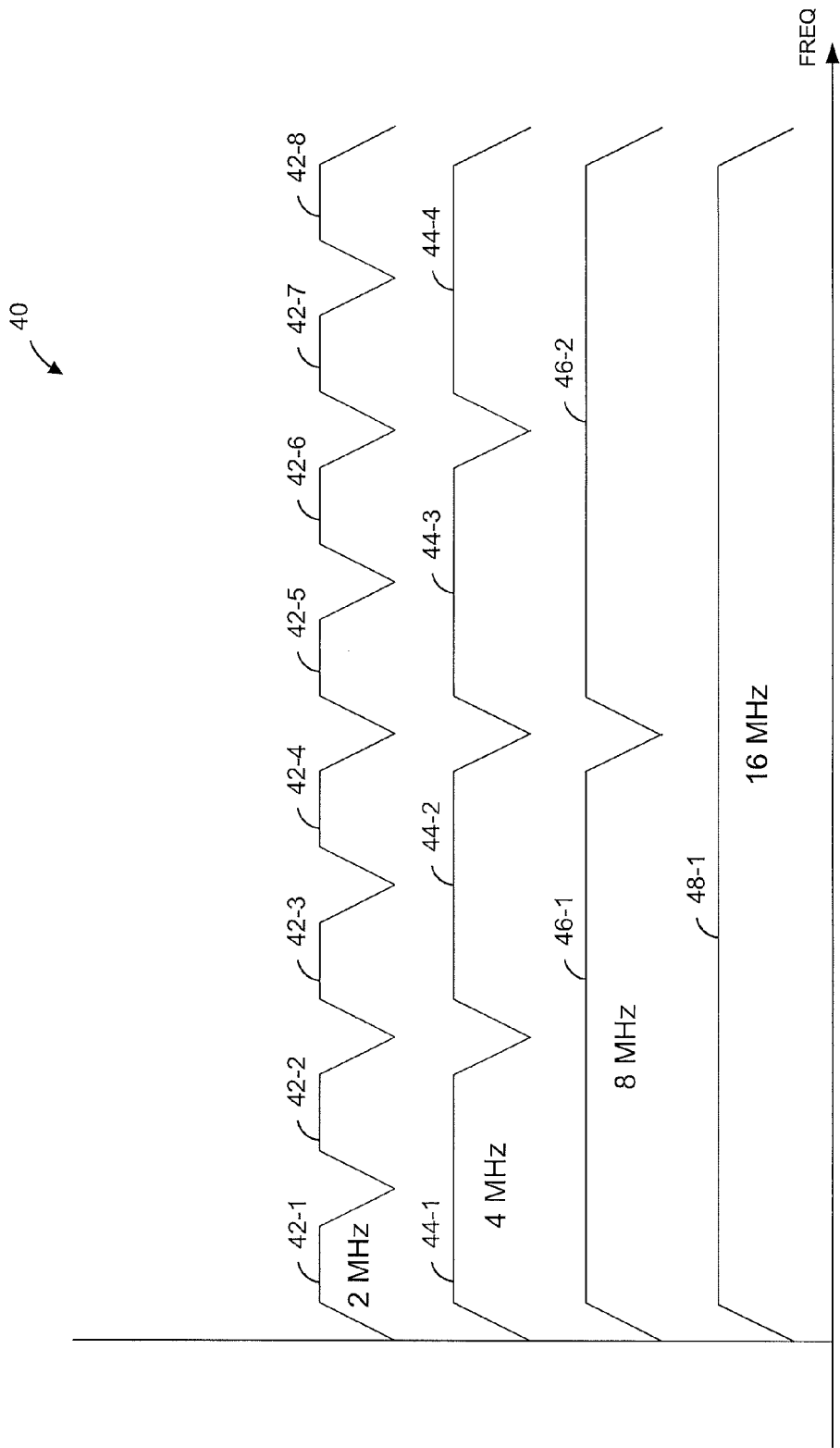
FIG. 2 is an example channelization scheme for a long range communication protocol, according to an embodiment.

FIG. 2 is a diagram of an example channelization scheme 40 for a long range communication protocol, according to an embodiment. The channelization scheme 40 is utilized for data stream transmissions in a WLAN (e.g., the WLAN 10 of FIG. 1), in an embodiment. For example, one or more channels within the channelization scheme 40 are used for OFDM transmissions from AP 14 to client station 25-1 of FIG. 1, and/or vice versa, in various embodiments and/or scenarios. Within the channelization scheme 40, in various different scenarios, "component" channels 42 are utilized individually for data transmissions, or are concatenated to form a larger communication channel, in an embodiment. In some embodiments, there may be more or fewer component channels 42 than illustrated in FIG. 2.

In some embodiments, two adjacent component channels 42 can be concatenated to form a channel 44. For example, component channels 42-1 and 42-2 can be concatenated to form channel 44-1. Similarly, component channels 42-3 and 42-4 can be concatenated to form channel 44-2. Moreover, in some embodiments, four adjacent component channels 42 can be concatenated to form a channel 46. For example, component channels 42-1 through 42-4 can be concatenated to form channel 46-1. Similarly, component channels 42-5 through 42-8 can be concatenated to form channel 46-2. Further, in some embodiments, eight adjacent component channels 42 can be concatenated to form a channel 48. For example, component channels 42-1 through 42-8 can be concatenated to form channel 48-1.

In an embodiment, an AP (e.g., AP 14 of FIG. 1) assigns a priority to one or more of the component channels 42 when establishing a BSS. In one embodiment, for example, the AP designates one of the channels 42 as a "primary" channel, and one or more of the component channels 42 as a "secondary" channel. In some embodiments, one or more additional priority levels ("tertiary," etc.) are also assigned to other component channels 42. The assigned primary, secondary, etc., component channels 42 are monitored for media access control purposes (i.e., to determine an available channel for data transmissions within the BSS), in an embodiment.

In the example channelization scheme 40, each component channel 42 has a bandwidth of 2 MHz, each channel 44 has a bandwidth of 4 MHz, each channel 46 has a bandwidth of 8 MHz, and the channel 48-1 has a bandwidth of 16 MHz. In other embodiments, each component channel 42 has a different, suitable bandwidth, such as 1 MHz, 5 MHz, 10 MHz, 20 MHz, etc. In one embodiment, long range data units are generated by the AP (e.g., AP 14) or the client station (e.g., client station 25-1) to have a bandwidth equal to the bandwidth of the widest available channel of the channels 42, 44, 46 and 48. In one embodiment, the widest available channel is the channel that satisfies one or more media access rules. In one embodiment, for example, any BSS channel must include the component channel 42 which the AP designated as the primary channel (i.e., no transmission is permitted unless the primary channel is determined to be idle). More generally, in some embodiments, a component channel 42 that has a lower priority is treated as busy (regardless of whether the component channel 42 is busy or idle) if another component channel 42 having a higher priority is determined to be busy. Example media access techniques using primary, secondary, etc., channel designations, according to various embodiments, are described in U.S. patent application Ser. No. 13/034,409, "Methods and Apparatus for Determining a Composite Channel," the disclosure of which is hereby incorporated by reference herein.

Figure 3A:
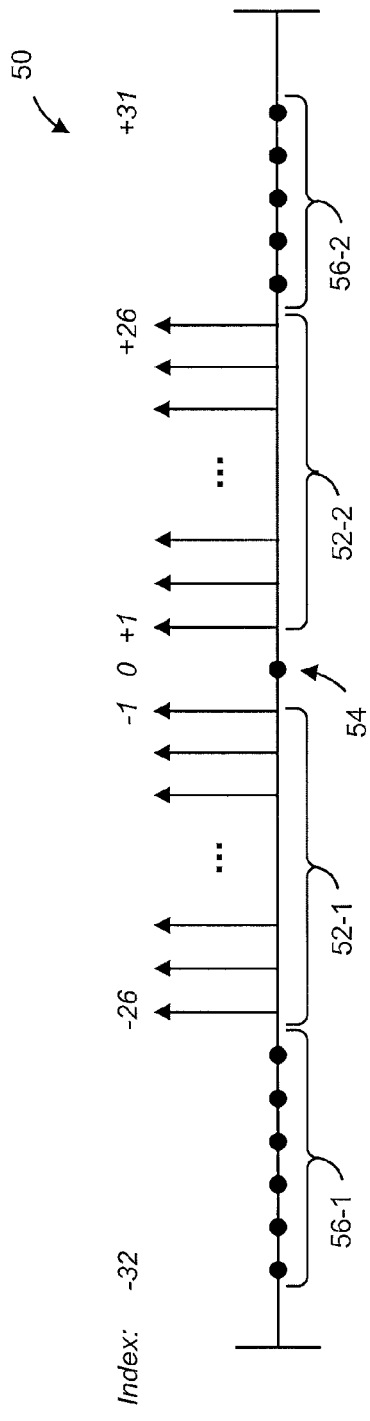
FIGS. 3A, 3B, 3C and 3D are tone map diagrams, according to IEEE 802.11n and/or IEEE 802.11ac, of a 20 MHz legacy packet, a 20 MHz non-legacy packet, a true 40 MHz packet, and a legacy duplicate mode 40 MHz packet, respectively.

FIGS. 3A-3D are diagrams of tone map diagrams of data units (packets) conforming to the currently available IEEE 802.11n and/or 802.11ac Standards. Referring first to FIG. 3A, the tone map 50 is an OFDM tone map of the LTF and data portion of a 20 MHz legacy packet that can be decoded by legacy IEEE 802.11a or 802.11g devices. The tone map 50 includes low-side non-zero tones 52-1 and high-side non-zero tones 52-2. With specific reference to the data portion, the tone map 50 includes 24 low-side data tones and two low-side pilot tones within tones 52-1, and includes 24 high-side data tones and two high-side pilot tone within tones 52-2. The tone map 50 also includes a DC (null) tone 54, six lower-edge guard (null) tones 56-1, and five upper-edge guard (null) tones 56-2.

Figure 3B:
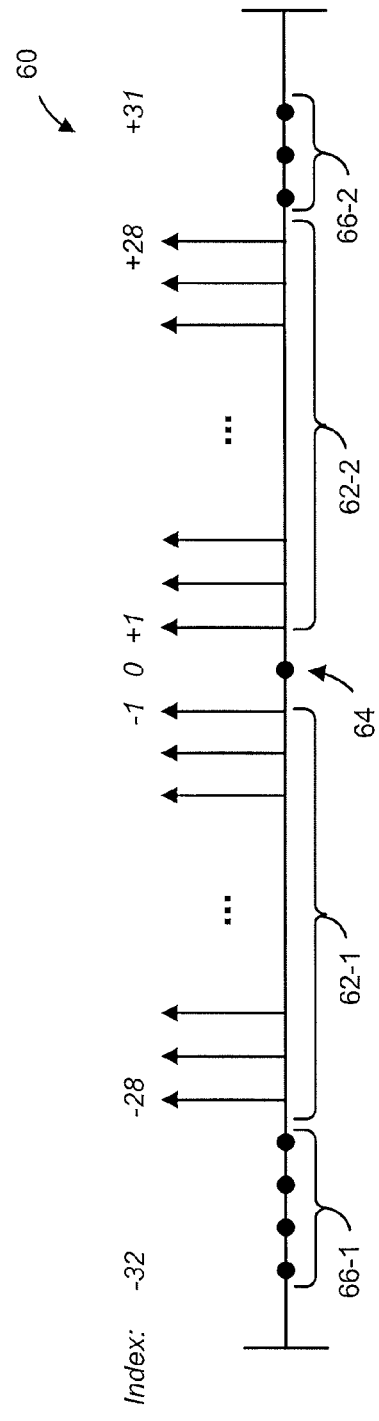

The tone map 60 of FIG. 3B is an OFDM tone map of the LTF and data portion of a non-legacy 20 MHz packet conforming to the IEEE 802.11n and 802.11ac Standards. The tone map 60 includes low-side non-zero tones 62-1 and high-side non-zero tones 62-2. With specific reference to the data portion, the tone map 60 includes 26 low-side data tones and two low-side pilot tones within tones 62-1, and includes 26 high-side data tones and two high-side pilot tone within tones 62-2. The tone map 60 also includes a DC (null) tone 64, four lower-edge guard (null) tones 66-1, and three upper-edge guard (null) tones 66-2. Thus, the 20 MHz non-legacy packet with tone map 60 has two fewer lower-edge guard tones, and two fewer upper-edge guard tones, than the 20 MHz legacy packet with tone map 50 of FIG. 3A.

Figure 3C:
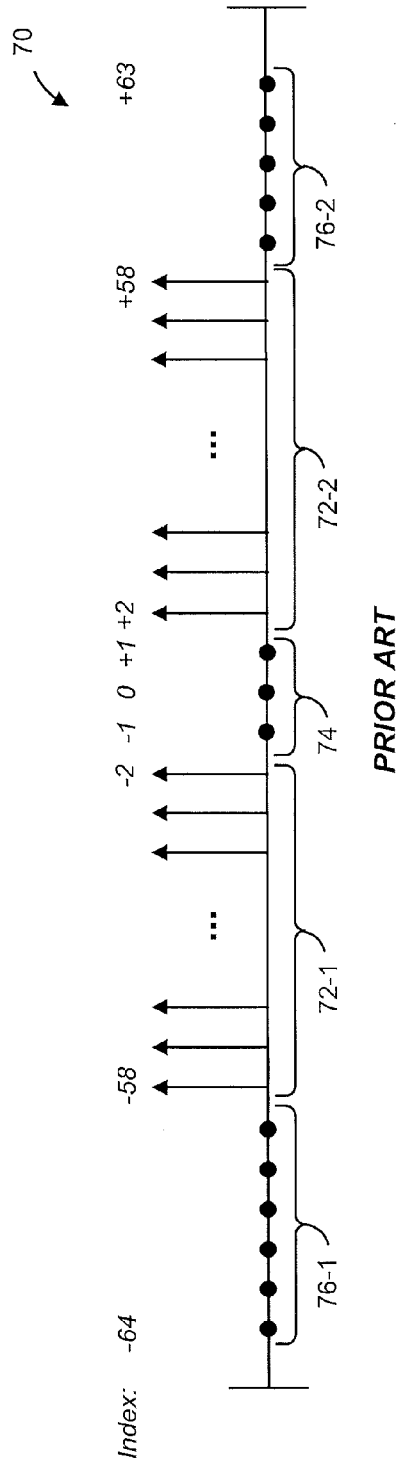

The tone map 70 of FIG. 3C is an OFDM tone map of the LTF and data portion of a true (non-duplicate mode) 40 MHz packet conforming to the IEEE 802.11n and 802.11ac Standards. The tone map 70 includes low-side non-zero tones 72-1 and non-zero high-side tones 72-2. With specific reference to the data portion, the tone map 70 includes 54 low-side data tones and three low-side pilot tones within tones 72-1, and includes 54 high-side data tones and three high-side pilot tone within tones 72-2. The tone map 70 also includes three DC (null) tones 74, six lower-edge guard (null) tones 76-1, and five upper-edge guard (null) tones 76-2. Thus, the true 40 MHz packet with tone map 70 has the same number of lower-edge and upper-edge guard tones as the 20 MHz legacy packet (tone map 50), and both the true 40 MHz packet and the 20 MHz legacy packet have more lower-edge and upper-edge guard tones than the 20 MHz non-legacy packet (tone map 60).

In order to avoid a scenario in which duplicate mode 40 MHz (or wider) packets necessitate tighter filter design requirements than true 40 MHz (or wider) packets, the IEEE 802.11n and 802.11ac Standards do not define any mode or data unit in which 20 MHz non-legacy packets having the tone map 60 are duplicated in two or more sub-bands of a wider bandwidth signal. Instead, as stated above, the IEEE 802.11n and 802.11ac Standards define a legacy duplicate mode in which a full (preamble and data portion) 20 MHz legacy packet is duplicated in two or more sub-bands, and IEEE 802.11n further defines an MCS32 duplicate mode in which the data portion of a legacy packet is duplicated in two sub-bands but the preamble portion is the same as a true 40 MHz packet.

Figure 3D:
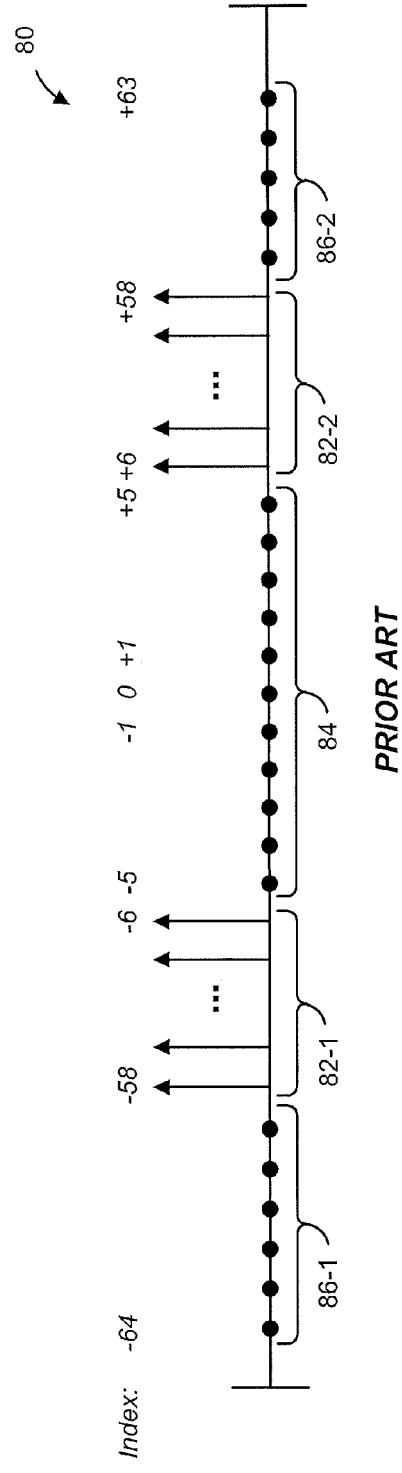

The tone map 80 of FIG. 3D is an OFDM tone map of the LTF and data portion of a legacy duplicate mode 40 MHz packet conforming to the IEEE 802.11n and 802.11ac Standards. The tone map 80 includes low-side non-zero tones 82-1 and high-side non-zero tones 82-2. Because tone map 80 corresponds to the legacy duplicate mode, tones 82-1 are identical to tones 52-1, 54 and 52-2 of the 20 MHz legacy data unit shown in tone map 50, and tones 82-2 are also identical to tones 52-1, 54 and 52-2 of the 20 MHz legacy data unit shown in tone map 50. The tone map 80 also includes 11 DC (null) tones 84, six lower-edge guard (null) tones 86-1, and five upper-edge guard (null) tones 86-2.

Because packets in the legacy duplicate mode utilize frequency duplication of the 20 MHz legacy packet (tone map 50) for both the LTF and the data portion, six lower-edge guard tones and five upper-edge guard tones are maintained throughout the legacy duplicate mode packet. Thus, the legacy duplicate mode 40 MHz packet has the same guard tone protection as the true 40 MHz packet corresponding to tone map 70 of FIG. 3C. Accordingly, for a packet with a given bandwidth, the same transmit/receive filter design requirements can be used regardless of whether the packet corresponds to the legacy duplicate mode. Transmit and receive filtering requirements are typically dictated by the band edge that corresponds to the smaller number of guard tones. For example, the transmit/receive filter design requirements for a packet with six lower-edge guard tones and five upper-edge guard tones would typically be dictated by the five upper-edge guard tones.

In the MCS32 duplicate mode of the IEEE 802.11n Standard, a 40 MHz data unit utilizes the preamble of a true 40 MHz data unit, while the data portion is the same as in the legacy duplicate mode (i.e., the data portion consists of a frequency duplicate of a 20 MHz legacy packet within each of the two 20 MHz sub-bands). Accordingly, an MCS32 duplicate mode 40 MHz packet has an LTF with the tone map 70, and a data portion with the tone map 80. Thus, as in the legacy duplicate mode, the MCS32 duplicate mode 40 MHz packet provides the same number of lower-edge and upper-edge guard tones as a true 40 MHz packet, and allows the same transmit/receive filter design requirements as the true 40 MHz packet. By using a true 40 MHz packet preamble, however, the MCS32 duplicate mode does not allow a receiver to utilize combining techniques when decoding the SIG field, which can create a bottleneck for receiver sensitivity.

Notably, the non-zero tones of the LTF of a 20 MHz legacy packet have the same tone values as the respective non-zero tones in each of the upper and lower 20 MHz sub-bands of a true 40 MHz packet LTF. Thus, the MCS32 duplicate mode 40 MHz packet, like the legacy duplicate mode 40 MHz packet, has the property that each 20 MHz sub-band can appear to a receiving device as a stand-alone 20 MHz legacy data unit.

In some embodiments, a long range communication protocol utilizes frequency duplication to provide BSS and/or OBSS bandwidth protection, and/or to increase receiver sensitivity, but does not define any data units that correspond to down-clocked versions of legacy packets (or portions thereof). Thus, in these embodiments, the long range communication protocol cannot utilize down-clocked versions of either the MCS32 duplicate mode data unit (duplicating the data portion of a legacy packet) or the legacy duplicate mode data unit (duplicating the entire legacy packet). Accordingly, in these embodiments, the long range communication protocol must use a technique different than that of the IEEE 802.11n and 802.11ac Standards in order to generate duplicate mode data units. In one embodiment, a duplicate mode, long range data unit (e.g., packet) is generated by duplicating a non-legacy, narrower-bandwidth long range data unit in each of two or more sub-bands. In one embodiment, for example, a non-legacy, long range data unit corresponding to a narrowest possible BSS channel bandwidth is duplicated in each sub-band. For ease of explanation, the long range communication protocol is described below with reference to an embodiment that utilizes a channelization scheme similar to that shown in FIG. 2, such that the narrowest possible BSS channel bandwidth is 2 MHz, and such that a duplicate mode or non-duplicate mode long range data unit has a bandwidth of 2 MHz, 4 MHz, 8 MHz or 16 MHz, depending on the BSS channel.

FIGS. 4A, 4B and 4C are example tone map diagrams of a 2 MHz long range data unit, a true 4 MHz long range data unit (formed without using frequency duplication), and a duplicate mode 4 MHz long range data unit, respectively, according to one embodiment. The tone maps of FIGS. 4A-4C represent tones for at least the data portion of the respective data unit. In various embodiments and/or scenarios, the tone maps of FIGS. 4A-4C correspond to long range data units generated by the PHY processing unit 20 of AP 14 or the PHY processing unit 29 of client station 25-1 in FIG. 1.

Referring first to FIG. 4A, a tone map 200 shows that a 2 MHz long range data unit includes low-side non-zero tones 202-1 and high-side non-zero tones 202-2. In one embodiment, for example, and with reference to a data portion of the 2 MHz long range data unit, the tone map 200 includes 26 low-side data tones and two low-side pilot tones within tones 202-1, and includes 26 high-side data tones and two high-side pilot tones within tones 202-2. The tone map 200 also includes a DC (null) tone 204, four lower-edge guard (null) tones 206-1, and three upper-edge guard (null) tones 206-2. In an embodiment, the tone map 200 is generated using a 64-point IFFT. Moreover, in an embodiment, the 2 MHz long range data unit corresponding to tone map 200 is a 10× down-clocked version of a 20 MHz non-legacy packet as defined by the IEEE 802.11n or 802.11ac Standard.

Referring next to FIG. 4B, a tone map 220 shows that a true 4 MHz long range data unit, formed without frequency duplication, includes low-side non-zero tones 222-1 and high-side non-zero tones 222-2. In one embodiment, for example, and with reference to a data portion of the true 4 MHz long range data unit, the tone map 220 includes 54 low-side data tones and three low-side pilot tones within tones 222-1, and includes 54 high-side data tones and three high-side pilot tones within tones 222-2. The tone map 220 also includes three DC (null) tones 224, six lower-edge guard (null) tones 206-1, and five upper-edge guard (null) tones 206-2. In various embodiments, the tone map 220 is generated using a 128-point IFFT, or two 64-point IFFTs in parallel, etc. Moreover, in an embodiment, the true 4 MHz long range data unit corresponding to tone map 220 is a 10× down-clocked version of a true 40 MHz data unit as defined by the IEEE 802.11n or 802.11ac Standard.

FIG. 4C shows a tone map 240 corresponding to a duplicate mode 4 MHz long range data unit, where the data unit is generated by duplicating the 2 MHz long range data unit corresponding to tone map 200 in each 2 MHz sub-band, e.g., to improve receiver sensitivity and/or provide more robust channel protection as compared to the true 4 MHz long range data unit. The tone map 240 includes low-side non-zero tones 242-1 and high-side non-zero tones 242-2. In one embodiment, for example, and with reference to a data portion of the duplicate mode 4 MHz long range data unit, the tone map 240 includes 52 low-side data tones and four low-side pilot tones within tones 242-1, and includes 52 high-side data tones and four high-side pilot tones within tones 242-2. The tone map 240 also includes seven DC (null) tones 244, four lower-edge guard (null) tones 246-1, and three upper-edge guard (null) tones 246-2. In an embodiment, the tones at indices −64 to −1 of tone map 240 are identical to the tones at indices −32 to +31, respectively, of tone map 200, and the tones at indices 0 to +63 of tone map 240 are also identical to the tones at indices −32 to +31, respectively, of tone map 200.

In other embodiments, the tone maps 200, 220 and/or 240 include different numbers of non-zero tones (e.g., data tones and/or pilot tones), DC tones, lower-edge guard tones, and/or upper-edge guard tones than are shown in FIGS. 4A-4C. As in FIGS. 4A-4C, however, the tone map 200 in each of these alternative embodiments includes fewer lower-edge and upper-edge guard tones than tone map 220 of the true 4 MHz long range data unit, which in turn causes the duplicate mode tone map 240 to include fewer lower-edge and upper-edge guard tones than tone map 220. In these alternative embodiments, as in the embodiment shown in FIGS. 4A-4C, the reduced number of guard tones in the duplicate mode 4 MHz long range data unit (tone map 240) gives rise to more stringent transmit and/or receive filter requirements as compared to the true 4 MHz long range data unit (tone map 220).

In an embodiment, the long range communication protocol also supports one or more types of duplicate mode signals that have a bandwidth greater than 4 MHz. FIGS. 5A and 5B correspond to one embodiment in which an 8 MHz long range data unit may be generated either as a true 8 MHz long range data unit or a duplicate mode 8 MHz long range data unit. The tone maps of FIGS. 5A and 5B represent tones for at least the data portion of the respective data unit. In various embodiments and/or scenarios, the tone maps of FIGS. 5A and 5B correspond to long range data units generated by the PHY processing unit 20 of AP 14 or the PHY processing unit 29 of client station 25-1 in FIG. 1.

Referring first to FIG. 5A, the tone map 300 shows that a true 8 MHz long range data unit, without frequency duplication, includes low-side non-zero tones 302-1 and high-side non-zero tones 302-2. In one embodiment, for example, and with reference to a data portion of the true 8 MHz long range data unit, the tone map 300 includes 117 low-side data tones and four low-side pilot tones within tones 302-1, and includes 117 high-side data tones and four high-side pilot tones within tones 302-2. The tone map 300 also includes three DC (null) tones 304, six lower-edge guard (null) tones 306-1, and five upper-edge guard (null) tones 306-2. In various embodiments, the tone map 300 is generated using a 256-point IFFT, or four 64-point IFFTs in parallel, etc. Moreover, in an embodiment, the true 8 MHz long range data unit corresponding to tone map 300 is a 10× down-clocked version of a true 80 MHz data unit as defined by the IEEE 802.11ac Standard.

FIG. 5B shows a tone map 320 corresponding to another 8 MHz long range data unit, in which the data unit is generated by duplicating the 2 MHz long range data unit (corresponding to tone map 200 of FIG. 4A) within each 2 MHz sub-band, e.g., to improve receiver sensitivity and/or provide more robust channel protection as compared to the true 8 MHz long range data unit having tone map 300. The tone map 320 includes low-side non-zero tones 322-1 and 322-2, and high-side non-zero tones 322-3 and 322-4. The tone map 240 also includes seven DC (null) tones 324, four lower-edge guard (null) tones 330-1, and three upper-edge guard (null) tones 330-2. In an embodiment, the set of tones at indices −128 to −65 of tone map 320, the set of tones at indices −64 to −1 of tone map 320, the set of tones at indices 0 to +63 of tone map 320, and the set of tones at +64 to +127 of tone map 320 are each identical to the respective tones at indices −32 to +31 of tone map 200 in FIG. 4A. In various embodiments, the tone map 320 is generated using a 256-point IFFT, or four 64-point IFFTs in parallel, etc.

Other embodiments of tone maps 300 and/or 320 include different numbers of non-zero tones (e.g., data tones and/or pilot tones), DC tones, lower-edge guard tones, and/or upper-edge guard tones than are shown in FIGS. 5A and 5B. As with the embodiment shown in FIGS. 5A and 5B, however, the tone map 320 in each of these alternative embodiments includes fewer lower-edge and upper-edge guard tones than tone map 300 (for a true 8 MHz long range data unit), which in turn causes the duplicate mode tone map 320 to include fewer lower-edge and upper-edge guard tones than tone map 300. In these alternative embodiments, as in the embodiment of FIGS. 5A and 5B, the reduced number of guard tones in the duplicate mode 8 MHz long range data unit (tone map 320) gives rise to more stringent transmit and/or receive filter requirements as compared to the true 8 MHz long range data unit (tone map 300).

In some embodiments, the duplicate mode can also be used for still wider bandwidth signals. In one embodiment, for example, the long range communication protocol supports the 4 MHz duplicate mode corresponding to tone map 240 of FIG. 4C, the 8 MHz duplicate mode corresponding to tone map 320 of FIG. 5B, and a 16 MHz duplicate mode (not shown in the figures). In one such embodiment, true 16 MHz long range data units are generated such that each 8 MHz sub-band is the same as the true 8 MHz long range data unit (with tone map 300), and duplicate mode 16 MHz long range data units are generated such that each 8 MHz sub-band is the same as the duplicate mode 8 MHz long range data unit (with tone map 320). In this embodiment, the duplicate mode 16 MHz long range data unit gives rise to more stringent transmit and/or receive filter design requirements than the true 16 MHz long range data unit, similar to the 4 MHz and 8 MHz data units discussed above. In an embodiment, the true 16 MHz long range data unit is a 10× down-clocked version of a true 160 MHz data unit as defined by the IEEE 802.11ac Standard.

In some embodiments, each long range data unit can have one of multiple different preamble formats, such as the preamble formats shown in FIGS. 6A and 6B. FIG. 6A is a diagram of an example long range data unit 400 having a "short preamble" format, according to one such embodiment. The long range data unit 400 includes a short preamble 402 and a data portion 404. In the example embodiment of FIGS. 6A and 6B, the short preamble 402 includes an STF 410 with two OFDM symbols, a first LTF (LTF1) 412 with two OFDM symbols, a SIG field 414 with two OFDM symbols, and a total of N−1 additional LTFs (416-1 through 416-N) each having one OFDM symbol. In an embodiment, the STF 410 is used for packet detection and automatic gain control, the LTFs 412 and 416-1 through 416-N are used for channel estimation, and the SIG field 414 indicates certain PHY characteristics of the data unit (e.g., length or duration, MCS, etc.). In an embodiment, the short preamble 402 includes one LTF for each multiple input multiple output (MIMO) spatial stream (e.g., for two spatial streams, such that the short preamble 402 includes LTF1 412 and LTF2 416-1, but no additional LTFs). In an embodiment, the long range data unit 400 has the same format as an IEEE 802.11n data unit with a "Greenfield" preamble format.

FIG. 6B is a diagram of an example long range data unit 420 having a "long preamble" format. The long range data unit 420 includes a long preamble 422 and a data portion 424. In the example embodiment of FIGS. 6A and 6B, the long preamble 422 includes a first, legacy STF (L-STF) 430 with two OFDM symbols, a first, legacy LTF (L-LTF1) 432 with two OFDM symbols, a first, legacy SIG (SIGA) field 434 with two OFDM symbols, a second, non-legacy STF 440 with one OFDM symbol, N−1 additional, non-legacy LTFs (442-1 through 442-N) each having one OFDM symbol, and a second, non-legacy SIG (SIGB) field 444 with one OFDM symbol. In an embodiment, the long preamble format of long range data unit 420 is used when in a multi-user mode, and the LTFs 442 of the long preamble 422 include one LTF per user. In some embodiments, a receiver can auto-detect whether a long range data unit has the short or long preamble format by determining the modulation type of one or more OFDM symbols within the first SIG field (i.e., SIG field 414 in long range data unit 400, or SIGA field 434 in long range data unit 420). In an embodiment, the long range data unit 420 has the same format as an IEEE 802.11n data unit with a "mixed mode" preamble format, or the same format as an IEEE 802.11ac data unit.

In some embodiments, duplicate mode long range data units include not only frequency duplicates of the data portion of a 2 MHz long range data unit, but also frequency duplicates of the preamble portion of a 2 MHz long range data unit. In one embodiment in which a 2 MHz long range data unit has a preamble with an STF, LTF, and SIG field, for example, a duplicate mode, 4 MHz or greater long range data unit duplicates the 2 MHz STF in each 2 MHz sub-band, duplicates the 2 MHz LTF in each 2 MHz sub-band (e.g., resulting in the tone map 240 of FIG. 4C for the LTF tones, in an embodiment), and duplicates the 2 MHz SIG field in each 2 MHz sub-band. By duplicating a 2 MHz signal LTF rather than using a true 4 MHz (or greater) long range data unit preamble, a receiving device can obtain valid channel estimation across all non-zero tones of the data portion of the duplicate mode, long range data unit.

In other embodiments, however, duplicate mode long range data units instead use the tone plan of a true 4/8/16 MHz long range data unit for the LTF. For example, in one embodiment where duplicate mode 4 MHz long range data units have a data portion with tone plan 240 of FIG. 4C, the LTF of the duplicate mode 4 MHz long range data unit instead has the tone plan 220 of FIG. 4B. In such an embodiment, receiver performance may be degraded at the lower and upper 2 MHz sub-bands due to the fact that the data portion in each of those sub-bands has two more tones than the corresponding 2 MHz portion of the LTF in those sub-bands.

In one embodiment where duplicate mode long range data units duplicate the preamble as well as the data portion, the fields within each duplicated 2 MHz SIG field are the same as the fields within a stand-alone 2 MHz long range data unit (e.g., include a bandwidth field, an MCS field, a coding field, etc., in an embodiment), and the bandwidth field indicates a 2 MHz bandwidth. In this embodiment, each 2 MHz sub-band of the duplicate mode signal appears, to a receiving device, to be the same as a stand-alone 2 MHz signal.

Figure 7A:
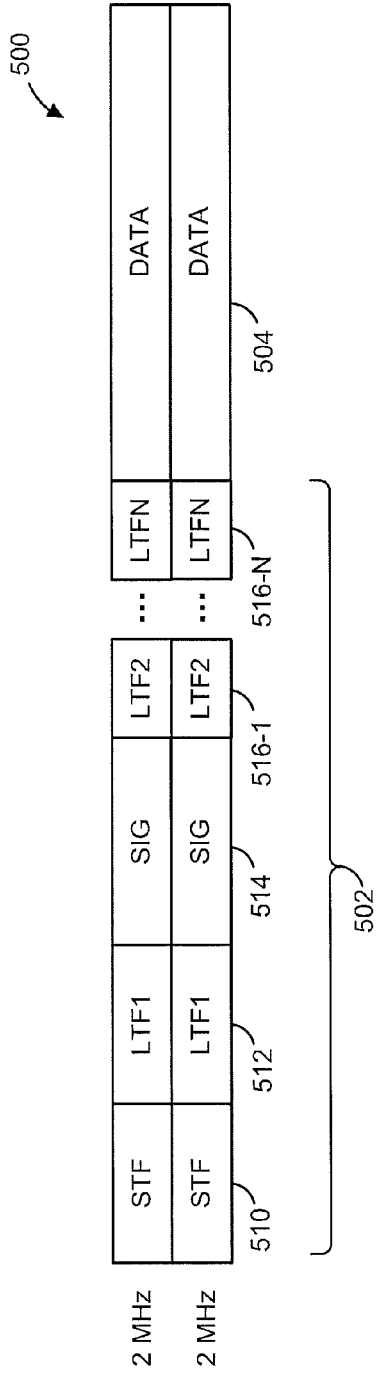
FIGS. 7A and 7B are diagrams of an example duplicate mode 4 MHz long range data unit having the short preamble format of FIG. 6A, and an example duplicate mode 4 MHz long range data unit having the long preamble format of FIG. 6B, respectively, according to an embodiment.
Figure 7B:
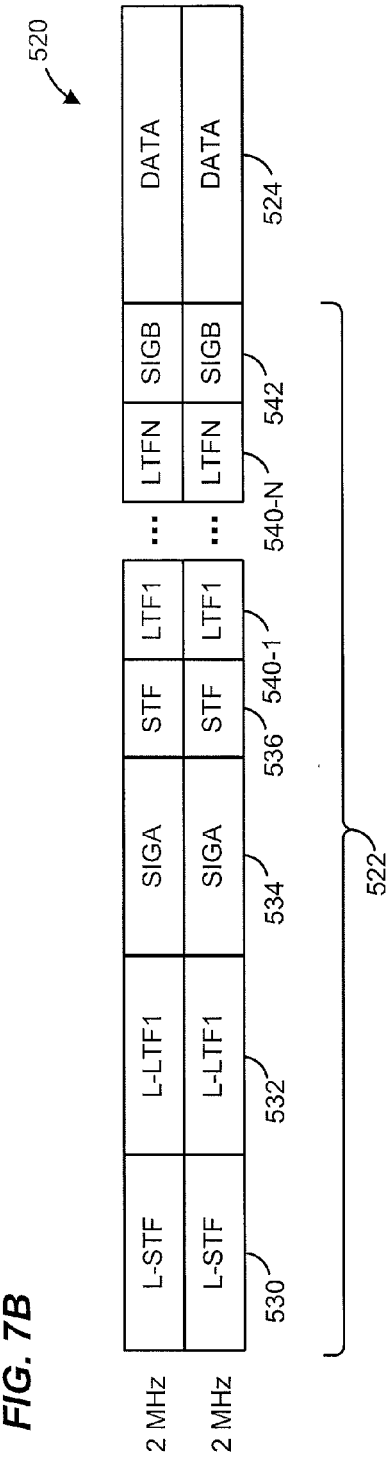

In one embodiment where long range data units can have either the short preamble format of FIG. 6A or the long preamble format of FIG. 6B, the long range communication protocol supports the duplicate mode only for long range data units that have the short preamble format. In another embodiment, the long range communication protocol supports the duplicate mode for long range data units having either a short or a long preamble format. FIGS. 7A and 7B are diagrams of an example duplicate mode 4 MHz long range data unit having the short preamble format of FIG. 6A, and an example duplicate mode 4 MHz long range data unit having the long preamble format of FIG. 6B, respectively, according to an embodiment. Referring first to FIG. 7A, the duplicate mode 4 MHz long range data unit 500 includes a duplicated short preamble 502 and a duplicated data portion 504. The duplicated short preamble 502 includes a duplicated STF 510, LTF1 512, SIG field 514, and LTFs 516-1 through 516-N, with each 2 MHz duplicate being the same (i.e., having the same tone map, and in some embodiments having the same SIG field contents) as STF 410, LTF1 412, SIG field 414, and LTFs 416-1 through 416-N of FIG. 6A, respectively, in an embodiment. Each 2 MHz duplicate in the duplicated data portion 504 is the same (i.e., has the same tone map) as the data portion 404 of FIG. 6A, in an embodiment.

Referring next to FIG. 7B, the duplicate mode 4 MHz long range data unit 520 includes a duplicated long preamble 522 and a duplicated data portion 524. The duplicated long preamble 522 includes a duplicated L-STF 530, L-LTF1 532, SIGA field 534, STF 536, LTFs 540-1 through 540-N, and SIGB field 542, with each 2 MHz duplicate being the same (i.e., having the same tone map, and in some embodiments having the same SIG field contents) as L-STF 430, L-LTF1 432, SIGA field 434, STF 440, LTFs 442-1 through 442-N, and SIGB field 444 of FIG. 6B, respectively, in an embodiment. Each 2 MHz duplicate in the duplicated data portion 524 is the same (i.e., has the same tone map) as the data portion 424 of FIG. 6B, in an embodiment.

In some embodiments, the long range communication protocol supports a "coordinated duplicate mode" in which the data plan and preamble are duplicated according to any of the embodiments described above, but in which the SIG field (e.g., duplicated SIG field 514 of FIG. 7A) or SIGA field (e.g., duplicated SIGA field 534 of FIG. 7B) indicates a duplicate mode rather than indicating a 2 MHz signal. In one such embodiment, a bandwidth field of the SIG/SIGA field indicates the full bandwidth of the duplicate mode long range data unit (e.g., 4 MHz, 8 MHz or 16 MHz, in an embodiment) to a receiving device, and an otherwise unused/reserved MCS is used to indicate duplicate mode to the receiving device. In one embodiment where the long range communication protocol defines an "MCS0" through "MCS9" for various non-duplicate mode modulation types and coding types/rates, but does not define an "MCS10," for example, MCS10 is used to indicate the duplicate mode to a receiver. In one such embodiment, the long range communication protocol only allows a single modulation type and coding type/rate (e.g., BPSK modulation at 1/2 BCC coding), and/or only a single number of spatial streams (e.g., one spatial stream), for the duplicate mode.

In another embodiment in which a bandwidth field of the SIG/SIGA field indicates the full bandwidth of the duplicate mode long range data unit, an otherwise unused/reserved SIG/SIGA field bit combination, or a new "duplicate field" in the SIG/SIGA field, is used to indicate the duplicate mode to a receiver. In some of these embodiments, the long range communication protocol allows any one of multiple different modulation types and/or coding types/rates for the duplicate mode. An example of this embodiment is shown in Table 1, for both a SIG field in a short preamble (e.g., the duplicated SIG field 514 in the short preamble format of long range data unit 500) and a SIG field in a long preamble (e.g., the duplicated SIG field 534 in the long preamble format of long range data unit 520):

TABLE 1

|  | Short Preamble | Long Preamble |
|---|---|---|
| Length/Duration | 9 | 9 |
| MCS | 4 | — |
| Bandwidth | 2 | 2 |
| Aggregation | 1 | — |
| STBC | 1 | 1 |
| Coding | 2 | 5 |
| SGI | 1 | 1 |
| GID | — | 6 |

TABLE 1-continued

|  | Short Preamble | Long Preamble |
|---|---|---|
| Nsts | 2 | 8 |
| PAID | 9 | — |
| ACK Indication | 2 | 2 |
| Reserved | 5 | 4 |
| CRC | 4 | 4 |
| Tail | 6 | 6 |
| Total | 48 | 48 |

In an embodiment, the various fields shown above are the same as those defined in the IEEE 802.11ac Standard, except for the "ACK indication" field indicating the format of the acknowledgement (ACK) frame of the current packet.

In some embodiments, the coding field of the short preamble in Table 1 includes a first bit to indicate whether BCC or LDPC encoding is used, and a second bit to indicate an extra symbol during LDPC encoding. In one such embodiment, however, the duplicate mode is only used with BCC encoding. To indicate duplicate mode, in this embodiment, the first bit of the coding field indicates that BCC encoding is used, while the second bit (which would otherwise be a "reserved" bit for BCC encoding) is used to indicate the duplicate mode to a receiver. Thus, in this embodiment, the second bit of the coding field indicates either 1) whether there is an extra symbol (if the first bit indicates LDPC encoding) or 2) whether the long range data unit is a duplicate mode data unit (if the first bit indicates BCC encoding). In other embodiments (e.g., embodiments where the duplicate mode is not restricted to BCC encoding), one of the "reserved" bits in the short and/or long preamble of Table 1 is instead designated as a "duplicate field," and used to indicate whether the long range data unit is a duplicate mode data unit.

In some embodiments in which the duplicate mode is indicated in the SIG (or SIGA) field (e.g., in the MCS field, in the coding field, or in a dedicated "duplicate field," in various embodiments), a receiver may choose to coherently combine the 2 MHz signals in each of two or more different 2 MHz sub-bands to improve reception. In one embodiment and scenario, for example, a receiver learns from the SIG or SIGA field that a current long range data unit is a duplicate mode data unit, and in response performs MRC combining on the different 2 MHz sub-band signals before decoding the duplicated 2 MHz signal. By utilizing MRC combining on the 2 MHz sub-bands, both combining gain and diversity gain may be achieved, thereby allowing the long range data unit to be correctly received and decoded at a lower signal-to-noise ratio (SNR) point.

In some embodiments, the long range communication protocol only allows the duplicate mode for data units with a data portion, such as data portion 504 of long range data unit 500 in FIG. 7A or data portion 524 of long range data unit 520 in FIG. 7B. In various other embodiments, however, the long range communication protocol instead, or additionally, allows a duplicate mode for null data packet (NDP) short MAC frames that do not include a data portion. In one embodiment, the duplicate mode is the same for NDP short MAC frames as the duplicate mode described above with reference to long range data units (e.g., STF, LTF and SIG field are duplicated in each 2 MHz sub-band), except that the data portion is omitted. Various types of NDP control frames (e.g., NDP short ACK frames or NDP short CTS frames) are described in U.S. patent application Ser. No. 13/586,678.

Figure 8:
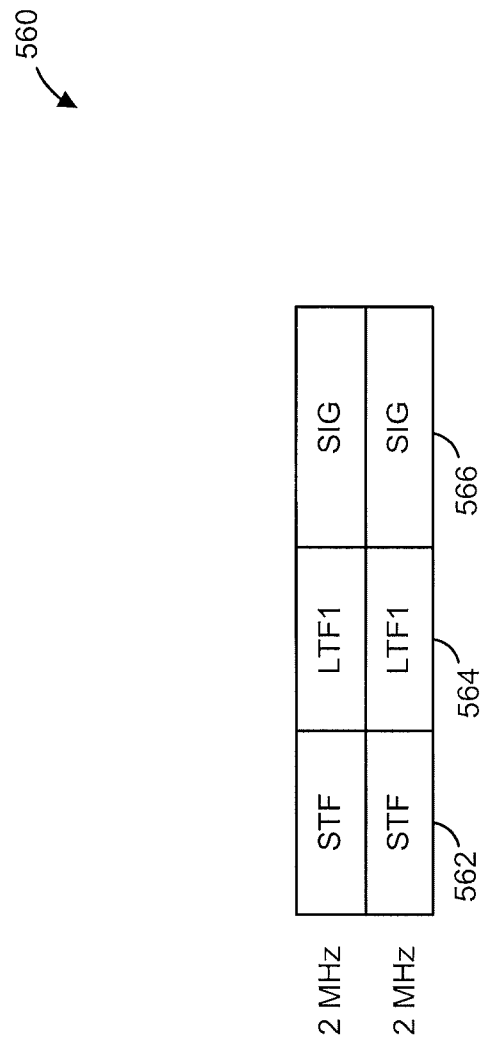
FIG. 8 is a diagram of an example duplicate mode 4 MHz long range null data packet, according to an embodiment.

FIG. 8 is a diagram of an example duplicate mode 4 MHz long range NDP 560, according to one such embodiment. The duplicate mode 4 MHz long range NDP 560 includes a duplicated STF 562, a duplicated LTF1 564, and a duplicated SIG field 566, similar to the duplicated STF 510, duplicated LTF1 512, and duplicated SIG field 514 in the long range data unit 500 of FIG. 7A, in an embodiment. Unlike the long range data unit 500, however, the duplicate mode 4 MHz long range NDP 560 does not include a data portion. In one embodiment, the duplicate mode 4 MHz long range NDP 560 is a short ACK frame used to protect the full 4 MHz bandwidth of a 4 MHz BSS channel.

In an alternative embodiment, an NDP short MAC frame in a 4 MHz bandwidth directly uses the true 4 MHz NDP short MAC frame for bandwidth protection. In this embodiment, the LTF1 of the 4 MHz NDP short MAC frame uses the tone plan of a true 4 MHz signal (e.g., having six lower-edge and five upper-edge guard tones), and the SIG field in each 2 MHz sub-band has the same number of lower-edge and upper-edge guard tones as the LTF1 (e.g., the same as a 10× downclocked IEEE 802.11a/g legacy packet with the lowest data rate, in an embodiment). Because there is no data portion, the LTF1 tone plan is sufficient for a receiver to decode the 2 MHz SIG field in each 2 MHz sub-band of the 4 MHz NDP short MAC frame. In some embodiments, duplicate mode NDP frames can also be generated in wider bandwidths (e.g., 8 MHz and/or 16 MHz) by utilizing additional frequency duplicates.

In some embodiments, the long range communication protocol applies a different phase shift to the duplicated 2 MHz long range data unit in each 2 MHz sub-band, in order to reduce the PAPR of the signal. In one embodiment, for example, a phase shift of [1, j] is applied to the two 2 MHz sub-bands of a duplicate mode 4 MHz long range data units (i.e., no phase shift to the lower 2 MHz sub-band, and a 90 degree phase shift to the upper 2 MHz sub-band), and a phase shift of [1, −1, −1, −1] is applied to the four 2 MHz sub-bands of a duplicate mode 8 MHz long range data unit (i.e., no phase shift to the lowest 2 MHz sub-band, and a 180 degree phase shift to each of the upper three 2 MHz sub-bands). In one embodiment where phase shifts are applied to the various 2 MHz sub-bands, the phase shifts are applied to both the preamble and the data portion of the respective 2 MHz sub-band. In some embodiments where the long range communication protocol allows duplicate mode for NDP frames, a similar set of phase shifts is applied to the 2 MHz sub-bands of each duplicate mode NDP frame.

Figure 9:
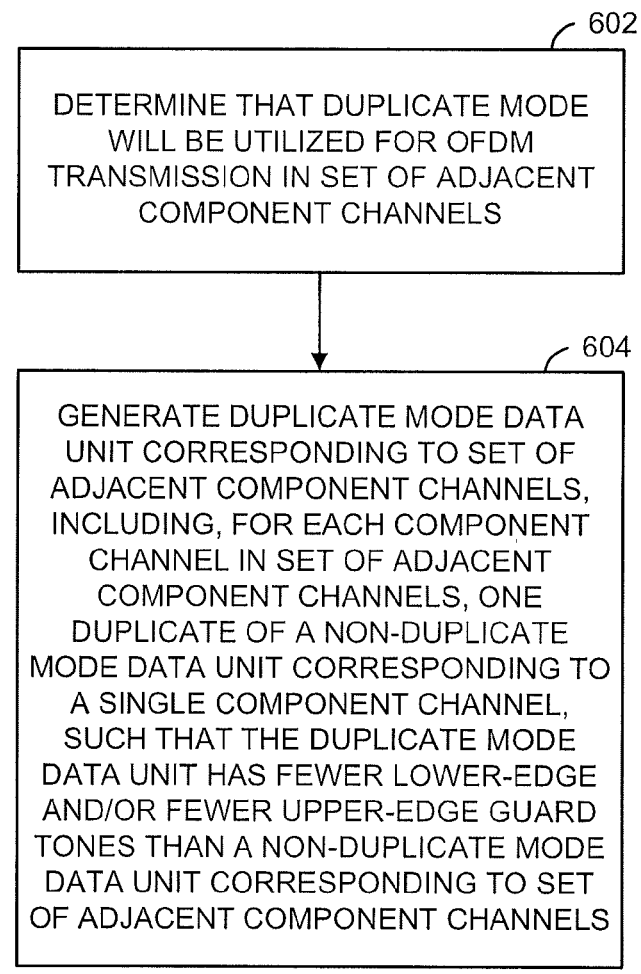
FIG. 9 is a flow diagram of an example method for generating orthogonal frequency division multiplexing (OFDM) signals to be transmitted in a basic service set (BSS) channel, according to an embodiment.

FIG. 9 is a flow diagram of an example method 600 for generating OFDM signals to be transmitted in a BSS channel, according to an embodiment. The method 600 is used in a communication network that employs a channelization scheme in which a set of two or more component channels can be aggregated to form the BSS channel (e.g., the channelization scheme 40 of FIG. 2, in an embodiment). In an embodiment, the component channel bandwidth is equal to the lowest permissible BSS channel bandwidth (e.g., 2 MHz in an embodiment where 2/4/8/16 MHz BSS channel bandwidths are permitted). In various embodiments and scenarios, the method 600 is implemented by the network interface 16 of AP 14, or by the network interface 27 of station 25-1, in FIG. 1, for example.

In an embodiment, the communication device implementing the method 600 operates according to a long range communication protocol that defines both a non-duplicate mode data unit corresponding to a single component channel within the component channels of the BSS channel, and a non-duplicate mode data unit corresponding to a set of adjacent component channels within the component channels of the BSS channel. The set of adjacent component channels is the same as (i.e., collectively coextensive with) the BSS channel (e.g., one of channels 44, 46 or 48 in FIG. 2), in some embodiments and/or scenarios. In other embodiments and/or scenarios, the set of adjacent component channels occupies less than the entire BSS channel. In some embodiments where each component channel has a 2 MHz bandwidth, the set of adjacent component channels has a total bandwidth of $2^N*(2$ MHz), where N is an integer greater than zero.

In an embodiment, the communication protocol specifies that a non-duplicate mode data unit corresponding to the set of adjacent component channels (e.g., a 4 MHz or greater non-duplicate mode data unit) has more lower-edge guard tones, and/or more upper-edge guard tones, than a non-duplicate mode data unit corresponding to a single component channel (e.g., a 2 MHz non-duplicate mode data unit). In one embodiment, for example, a non-duplicate mode data unit corresponding to a single component channel has the tone map 200 of FIG. 4A, and a non-duplicate mode data unit corresponding to the set of adjacent component channels is either a true 4 MHz data unit having the tone map 220 of FIG. 4B, or a true 8 MHz data unit having the tone map 300 of FIG. 5A.

At block 602, it is determined that a duplicate mode will be utilized for an OFDM transmission. In one embodiment and scenario, for example, it is determined that a duplicate mode will be utilized as a result of detecting poor channel conditions (e.g., in order to achieve diversity gain and/or combining gain). In one embodiment and/or scenario, a decision as to whether the duplicate mode will be used was initially made at an earlier time, and the determination at block 602 is made by checking the value of an indicator or flag that was set based on that earlier decision.

At block 604, a duplicate mode data unit corresponding to the set of adjacent component channels (e.g., the full BSS channel, in one embodiment and/or scenario) is generated in response to determining at block 602 that the duplicate mode will be utilized. The duplicate mode data unit is generated such that the duplicate mode data unit includes, for each component channel in the set of adjacent component channels, one duplicate (in frequency) of the non-duplicate mode data unit corresponding to a single component channel. Thus, the duplicate mode data unit is generated such that the duplicate mode data unit has fewer lower-edge guard tones and/or fewer upper-edge guard tones than a non-duplicate mode data unit corresponding to the same set of adjacent component channels. In one embodiment, the generated duplicate mode data unit has the same number of lower-edge guard tones and the same number of upper-edge guard tones as the non-duplicate mode data unit corresponding to the single component channel. For example, in one embodiment where the communication protocol defines the non-duplicate mode data unit corresponding to the single component channel as having the tone map 200 of FIG. 4A, and defines the non-duplicate mode data unit corresponding to the set of adjacent component channels as having the tone map 220 of FIG. 4B, the duplicate mode data unit is generated such that the duplicate mode data unit has the tone map 240 of FIG. 4C.

In one embodiment where the set of adjacent component channels has a total bandwidth of $2^N*(2$ MHz), with N being an integer greater than zero, generating the duplicate mode data unit at block 604 includes utilizing an IFFT of size $32*(N+1)$. In one embodiment, generating the duplicate mode data unit at block 604 includes multiplying each duplicate by a different phase rotation multiplier, in order to reduce PAPR of the duplicate mode data unit signal.

In an embodiment, the non-duplicate mode data unit corresponding to the single component channel includes both a preamble and a data portion, and the duplicate mode data unit generated at block 604 therefore also includes a (duplicated) preamble and data portion (e.g., as shown in FIG. 7A or 7B, in an embodiment). In an alternative embodiment, the duplicate mode data unit generated at block 604 duplicates the data portion of the non-duplicate mode data unit corresponding to the single component channel, but not the preamble (or not the entire preamble). In one embodiment, for example, the duplicate mode data unit generated at block 604 duplicates a data portion, STF and SIG field, but not the LTF, of the non-duplicate mode data unit corresponding to the single component channel, with the LTF instead having the same tone map as the LTF of the non-duplicate mode data unit corresponding to the set of adjacent component channels.

In some embodiments where the non-duplicate mode data unit corresponding to the single component channel includes a preamble with a SIG field, the SIG field includes a bandwidth field indicating a bandwidth to a receiving device. In one such embodiment, generating the duplicate mode data unit at block 604 includes setting the bandwidth field in each duplicate of the SIG field to indicate a bandwidth equal to the bandwidth of the single component channel (e.g., 2 MHz). In an alternative embodiment, the bandwidth field in each duplicate is set to indicate a total bandwidth of the set of adjacent component channels (e.g., 4 MHz or greater), i.e., the full bandwidth of duplicate mode data unit generated at block 604. In this latter alternative embodiment, a receiver may be unable to detect the duplicate mode based on the bandwidth field (and therefore unable to perform MRC combining of the SIG field, for example). Thus, in one such embodiment, a different field within the SIG field indicates the duplicate mode to a receiver. In various embodiments, for example, an MCS field, coding field, dedicated "duplicate field," or other suitable field within the SIG field indicates that the data unit generated at block 604 is a duplicate mode data unit.

In one embodiment, the method 600 includes an additional block (not shown in FIG. 9), prior to block 604 (and/or prior to block 602) in which it is determined that the set of adjacent component channels will be utilized for the OFDM transmission. In one embodiment where the method 600 is implemented within the station 25-1, for example, the network interface 27 of station 25-1 determines that the set of adjacent component channels will be utilized based on information specifying the set of adjacent component channels channel received from the AP 14 (e.g., by receiving an indicator of the BSS channel, in an embodiment where the adjacent component channels are coextensive with the BSS channel). In another embodiment, where the method 600 is implemented within the AP 14, the network interface 16 of AP 14 directly determines the set of adjacent component channels using a known media access technique. In other embodiments and/or scenarios, the set of adjacent component channels to be utilized is determined by checking the value of a previously set flag or other indicator.

Further, in one embodiment, the method 600 includes an additional block (not shown in FIG. 9) in which the duplicate mode data unit generated at block 604 is transmitted, or caused to be transmitted, to one or more communication devices other than the communication device implementing the method 600. In this embodiment, the duplicate mode data unit is transmitted, or caused to be transmitted, such that each duplicate of the non-duplicate mode data unit corresponding to the single component channel is transmitted via a different component channel of the set of adjacent component channels.

In some scenarios, the method 600 (or only step 604 of the method 600) is repeated for multiple iterations to generate multiple duplicate mode data units. Moreover, in some embodiments and scenarios, a method similar to method 600 is performed to generate one or more additional duplicate mode data units having different bandwidths. For example, in one embodiment where the method 600 generates a 4 MHz duplicate mode data unit containing two 2 MHz data unit duplicates, additional steps similar to blocks 602 and 604 may be performed a second time to generate an 8 MHz duplicate mode data unit containing four 2 MHz data unit duplicates, a third time to generate a 16 MHz duplicate mode data unit containing eight 2 MHz data unit duplicates, etc.

In some embodiments, the long range communication protocol defines not only non-duplicate mode and duplicate mode data units that correspond to a BSS channel (e.g., 2 MHz, 4 MHz, 8 MHz, or 16 MHz, in an embodiment), but also "low bandwidth mode" data units that are transmitted over a bandwidth smaller than any BSS channel (e.g., over a 1 MHz bandwidth) and have a lower data rate. In one embodiment where a "normal mode" (i.e., not corresponding to the low bandwidth mode) 2 MHz or greater data unit is generated using a 64-point or greater IFFT, for example, a low bandwidth mode 1 MHz data unit is generated using a 32-point IFFT. The lower data rate of the low bandwidth mode data unit allows the low bandwidth mode to further extend communication range, which generally improves receiver sensitivity, in an embodiment. In various embodiments, the low bandwidth mode is used only as a control mode (e.g., for signal beacon or association procedures, transmit beamforming training operations, etc.), only for extended range data communications, or both. Example formats of low bandwidth mode data units, and the generation of such data units, according to various embodiments, are described in U.S. patent application Ser. No. 13/366,064, "Control Mode PHY for WLAN," and U.S. patent application Ser. No. 13/494,505, "Low Bandwidth PHY for WLAN," the disclosures of which are hereby incorporated by reference herein.

In various embodiments and/or scenarios, low bandwidth mode data units are transmitted within channels defined by the long range communication protocol, either singly (e.g., a 1 MHz transmission in a 2 MHz or greater channel bandwidth) or in duplicate (e.g., two or more duplicates or replicas, in the frequency domain, of a 1 MHz transmission in a 2 MHz or greater channel bandwidth). Example embodiments utilizing duplication of low bandwidth mode data units in wider BSS channel bandwidths are described in U.S. patent application Ser. No. 13/586,678, "Long Range WLAN Data Unit Format," and U.S. patent application Ser. No. 13/768, 876, "Low Bandwidth PHY Transmission in a Wider Bandwidth," the disclosures of which are hereby incorporated by reference herein. Moreover, in some embodiments, the long range communication protocol defines a special MCS for low bandwidth mode data units in which low-order modulation (e.g., BPSK) and low-rate coding (e.g., rate 1/2 coding) are used along with time-domain repetition, e.g., in order to further extend communication range. Example embodiments utilizing time-domain repetition for low bandwidth mode data units are described in U.S. patent application Ser. No. 13/494,505, "Low Bandwidth PHY for WLAN."

In some embodiments where the long range communication protocol defines both normal mode and low bandwidth mode data units, the long range communication protocol only allows duplication of normal mode data units, such as the example long range data unit 500 of FIG. 7A or the example long range data unit 520 of FIG. 7B. In other embodiments, the long range communication protocol additionally allows duplication of low bandwidth mode data units. In one embodiment where duplication of 1 MHz low bandwidth mode data units is allowed, a 2 MHz or wider duplicate mode signal (e.g., 2 MHz, 4 MHz, 8 MHz or 16 MHz, in one embodiment) formed by duplicating the 1 MHz low bandwidth mode data unit results in only three lower-edge guard tones and two upper-edge guard tones, and relatively strict filter design requirements.

In some embodiments, the long range communication protocol only allows a 1 MHz low bandwidth mode data unit to be transmitted in one 1 MHz sub-band of a BSS channel. In one embodiment, for example, a 1 MHz low bandwidth mode data unit can only be transmitted in a lower 1 MHz sub-band of a 2 MHz BSS channel. In another example embodiment, a 1 MHz low bandwidth mode data unit can only be transmitted in a lower 1 MHz sub-band of a 2 MHz primary channel within a 4 MHz or greater bandwidth BSS channel, so long as the 2 MHz primary channel is not located at the lowest 2 MHz sub-band of the BSS channel. In this embodiment, however, the 1 MHz low bandwidth mode data unit is transmitted in the upper half of the 2 MHz primary channel if the 2 MHz primary channel is located at the lowest 2 MHz sub-band of the BSS channel, in order to avoid the 1 MHz low bandwidth mode data unit being located at an edge of the BSS channel.

In other embodiments, frequency duplication of 1 MHz low bandwidth mode data units is used to provide bandwidth protection against a 1 MHz OBSS. In one embodiment, for example, the 1 MHz low bandwidth mode data unit is duplicated in each 1 MHz sub-band of a wider bandwidth signal (e.g., 2 MHz, 4 MHz, 8 MHz or 16 MHz), with the spectral mask of a true, wider bandwidth signal being met by scaling down or zeroing out one or more tones. In one embodiment where each 1 MHz low bandwidth mode data unit has three lower-edge and two upper-edge guard tones, for example, a 2 MHz data unit formed by duplicating a 1 MHz low bandwidth mode data unit can meet the true 2 MHz signal spectral mask by zeroing out or scaling down the upper-most tone of the 1 MHz low bandwidth mode data unit that is in the upper 1 MHz sub-band. In an embodiment, phase rotations are applied to each 1 MHz sub-band when a 1 MHz low bandwidth mode data unit is duplicated (e.g., phase rotations of [1, j] for a 2 MHz signal formed by duplicating the 1 MHz low bandwidth mode data unit). In these embodiments, because the STF and LTF are duplicated in each 1 MHz sub-band, each 1 MHz sub-band looks to a receiver like a stand-alone 1 MHz low bandwidth mode data unit. Therefore, a device setting its device filter bandwidth to only 1 MHz can still receive such a data unit, as can a device setting its device filter bandwidth to 2 MHz or greater. For both such devices, no extra processing (beyond that already needed for regular 1 MHz data unit reception) is required because both devices can receive the data unit as a stand-alone 1 MHz data unit in a single 1 MHz sub-band.

Other embodiments for locating a 1 MHz low bandwidth mode data unit, or duplicates thereof, within a BSS channel (including embodiments in which one or more tones are zeroed out or scaled down), are described in U.S. patent application Ser. No. 13/768,876.

At least some of the various blocks, operations, and techniques described above may be implemented utilizing hardware, one or more processors executing firmware instructions, one or more processors executing software instructions, or any combination thereof. When implemented utilizing one or more processors executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the one or more processors, cause the one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, in a communication device operating according to a communication protocol, for generating orthogonal frequency division multiplexing (OFDM) signals to be transmitted in a basic service set (BSS) channel, wherein a set of two or more component channels is collectively coextensive with the BSS channel, wherein the communication protocol defines (i) a non-duplicate mode data unit corresponding to a single component channel within the set of two or more component channels and (ii) a non-duplicate mode data unit corresponding to a first set of adjacent component channels within the set of two or more component channels, wherein the non-duplicate mode data unit corresponding to the single component channel has (i) a first number of lower-edge guard tones and (ii) a first number of upper-edge guard tones, wherein the non-duplicate mode data unit corresponding to the first set of adjacent component channels has (i) a second number of lower-edge guard tones and (ii) a second number of upper-edge guard tones, and wherein at least one of (i) the second number of lower-edge guard tones is greater than the first number of lower-edge guard tones or (ii) the second number of upper-edge guard tones is greater than the first number of upper-edge guard tones, the method comprising:

determining, at the communication device, that a duplicate mode will be utilized for a first OFDM transmission in the first set of adjacent component channels; and in response to determining that the duplicate mode will be utilized for the first OFDM transmission, generating, at the communication device, a first duplicate mode data unit corresponding to the first set of adjacent component channels, such that the first duplicate mode data unit has one or both of (i) less than the second number of lower-edge guard tones and (ii) less than the second number of upper-edge guard tones, wherein the first duplicate mode data unit includes, for each component channel in the first set of adjacent component channels, one duplicate, in frequency, of the non-duplicate mode data unit corresponding to the single component channel.

2. The method of claim 1, wherein generating the first duplicate mode data unit includes generating the first duplicate mode data unit such that the first duplicate mode data unit has (i) the first number of lower-edge guard tones and (ii) the first number of upper-edge guard tones.

3. The method of claim 1, further comprising:
transmitting the first duplicate mode data unit to one or more other communication devices such that each duplicate of the non-duplicate mode data unit corresponding to the single component channel is transmitted via a different component channel of the first set of adjacent component channels.

4. The method of claim 1, wherein the non-duplicate mode data unit corresponding to the single component channel includes a preamble and a data portion.

5. The method of claim 4, wherein:
the preamble includes a signal field;
the signal field includes a bandwidth field; and
generating the first duplicate mode data unit includes setting the bandwidth field in each duplicate to indicate a bandwidth equal to a bandwidth of the single component channel.

6. The method of claim 4, wherein:
the preamble includes a signal field;
the signal field includes a bandwidth field; and
generating the first duplicate mode data unit includes setting the bandwidth field in each duplicate to indicate a bandwidth equal to a total bandwidth of the first set of adjacent component channels.

7. The method of claim 6, wherein:
the signal field further includes a modulation and coding scheme (MCS) field; and
generating the first duplicate mode data unit includes setting the MCS field in each duplicate to indicate that the first duplicate mode data unit corresponds to the duplicate mode.

8. The method of claim 6, wherein:
the signal field further includes a coding field; and
generating the first duplicate mode data unit includes setting the coding field in each duplicate to indicate that the first duplicate mode data unit corresponds to the duplicate mode.

9. The method of claim 6, wherein:
the signal field further includes a duplicate field; and
generating the first duplicate mode data unit includes setting the duplicate field in each duplicate to indicate that the first duplicate mode data unit corresponds to the duplicate mode.

10. The method of claim 1, wherein the communication protocol further defines a non-duplicate mode data unit corresponding to a second set of adjacent component channels within the set of two or more component channels, wherein the second set of adjacent component channels includes more component channels than the first set of adjacent component channels, wherein the non-duplicate mode data unit corresponding to the second set of adjacent component channels has (i) a third number of lower-edge guard tones and (ii) a third number of upper-edge guard tones, and wherein at least one of (i) the third number of lower-edge guard tones is greater than the first number of lower-edge guard tones or (ii) the third number of upper-edge guard tones is greater than the first number of upper-edge guard tones, the method further comprising:
determining, at the communication device, that the duplicate mode will be utilized for a second OFDM transmission in the second set of adjacent component channels; and
in response to determining that the duplicate mode will be utilized for the second OFDM transmission,
generating, at the communication device, a second duplicate mode data unit corresponding to the second set of adjacent component channels, such that the second duplicate mode data unit has one or both of (i) less than the third number of lower-edge guard tones and (ii) less than the third number of upper-edge guard tones,
wherein the second duplicate mode data unit includes, for each component channel in the second set of adjacent component channels, one duplicate, in frequency, of the non-duplicate mode data unit corresponding to the single component channel.

11. The method of claim 1, wherein generating the first duplicate mode data unit includes multiplying each duplicate of the non-duplicate mode data unit corresponding to the single component channel by a different phase rotation multiplier.

12. The method of claim 1, wherein:
each component channel in the set of two or more component channels has a 2 MHz bandwidth;
the first set of adjacent component channels has a total bandwidth of $2^N*(2\text{ MHz})$, where N is an integer greater than zero; and
generating the first duplicate mode data unit includes utilizing an inverse fast Fourier transform (IFFT) of size $32*(N+1)$.

13. The method of claim 1, further comprising:
before generating the first duplicate mode data unit, determining, at the communication device, that the first set of adjacent component channels will be utilized for the first OFDM transmission.

14. A communication device comprising:
a network interface configured to
operate according to a communication protocol, wherein
the communication protocol defines (i) a non-duplicate mode data unit corresponding to a single component channel within a set of two or more component channels collectively coextensive with a basic service set (BSS) channel, and (ii) a non-duplicate mode data unit corresponding to a set of adjacent component channels within the set of two or more component channels,
the non-duplicate mode data unit corresponding to the single component channel has (i) a first number of lower-edge guard tones and (ii) a first number of upper-edge guard tones,
the non-duplicate mode data unit corresponding to the set of adjacent component channels has (i) a second number of lower-edge guard tones and (ii) a second number of upper-edge guard tones, and
at least one of (i) the second number of lower-edge guard tones is greater than the first number of lower-edge guard tones or (ii) the second number of upper-edge guard tones is greater than the first number of upper-edge guard tones, determine that a duplicate mode will be utilized for an orthogonal frequency division multiplexing (OFDM) transmission in the set of adjacent component channels, and in response to determining that the duplicate mode will be utilized for the OFDM transmission, generate a duplicate mode data unit corresponding to the set of adjacent component channels, such that the duplicate mode data unit has one or both of (i) less than the second number of lower-edge guard tones and (ii) less than the second number of upper-edge guard tones, wherein the duplicate mode data unit includes, for each component channel in the set of adjacent component channels, one duplicate, in frequency, of the non-duplicate mode data unit corresponding to the single component channel.

15. The communication device of claim 14, wherein the network interface is further configured to:

transmit the duplicate mode data unit to one or more other communication devices such that each duplicate of the non-duplicate mode data unit corresponding to the single component channel is transmitted via a different component channel of the set of adjacent component channels.

16. The communication device of claim 14, wherein:

the non-duplicate mode data unit corresponding to the single component channel includes a preamble and a data portion;

the preamble includes a signal field;

the signal field includes a bandwidth field; and the network interface is configured to generate the duplicate mode data unit at least in part by setting the bandwidth field in each duplicate to indicate a bandwidth equal to a bandwidth of the single component channel.

17. The communication device of claim 14, wherein the network interface is configured to generate the duplicate mode data unit at least in part by multiplying each duplicate of the non-duplicate mode data unit corresponding to the single component channel by a different phase rotation multiplier.

18. A nontransitory computer-readable medium storing instructions for operating according to a communication protocol, wherein the communication protocol defines (i) a non-duplicate mode data unit corresponding to a single component channel within a set of two or more component channels collectively coextensive with a basic service set (BSS) channel and (ii) a non-duplicate mode data unit corresponding to a set of adjacent component channels within the set of two or more component channels, wherein the non-duplicate mode data unit corresponding to the single component channel has (i) a first number of lower-edge guard tones and (ii) a first number of upper-edge guard tones, wherein the non-duplicate mode data unit corresponding to the set of adjacent component channels has (i) a second number of lower-edge guard tones and (ii) a second number of upper-edge guard tones, and wherein at least one of (i) the second number of lower-edge guard tones is greater than the first number of lower-edge guard tones or (ii) the second number of upper-edge guard tones is greater than the first number of upper-edge guard tones, and wherein the instructions, when executed by one or more processors, cause the one or more processors to:

determine that a duplicate mode will be utilized for an orthogonal frequency division multiplexing (OFDM) transmission in the set of adjacent component channels;

in response to determining that the duplicate mode will be utilized for the OFDM transmission, generate a duplicate mode data unit corresponding to the set of adjacent component channels, such that the duplicate mode data unit has one or both of (i) less than the second number of lower-edge guard tones and (ii) less than the second number of upper-edge guard tones, wherein the duplicate mode data unit includes, for each component channel in the set of adjacent component channels, one duplicate, in frequency, of the non-duplicate mode data unit corresponding to the single component channel.

19. The nontransitory computer-readable medium of claim 18, wherein:

the non-duplicate mode data unit corresponding to the single component channel includes a preamble and a data portion;

the preamble includes a signal field;

the signal field includes a bandwidth field; and the instructions cause the one or more processors to generate the duplicate mode data unit at least in part by setting the bandwidth field in each duplicate to indicate a bandwidth equal to a bandwidth of the single component channel.

20. The nontransitory computer-readable medium of claim 18, wherein the instructions cause the one or more processors to generate the duplicate mode data unit at least in part by multiplying each duplicate of the non-duplicate mode data unit corresponding to the single component channel by a different phase rotation multiplier.

* * * * *